(12) United States Patent
Burkhard et al.

(10) Patent No.: US 6,326,562 B1
(45) Date of Patent: Dec. 4, 2001

(54) FORCE-MEASURING APPARATUS, PARTICULARLY A WEIGHING CELL

(75) Inventors: Hans-Rudolf Burkhard, Wila; Luzi Hess, Zürich; Thomas Köppel, Oetwil a.S.; Jean-Christophe Emery, Schwerzenbach; Erwin Kaderli, Volketswil, all of (CH)

(73) Assignee: Mettler-Toledo GmbH, Greifensee (CH)

(*) Notice: Subject to any disclaimer, the term of this patent is extended or adjusted under 35 U.S.C. 154(b) by 0 days.

(21) Appl. No.: 09/391,524

(22) Filed: Sep. 8, 1999

(30) Foreign Application Priority Data

Sep. 30, 1998 (DE) ................................................ 198 45 023

(51) Int. Cl.⁷ .............................. G01G 3/14; G01G 7/00; G01G 23/01; G01L 1/04
(52) U.S. Cl. .................................. 177/210 EM; 177/229; 73/862.639; 73/1.15
(58) Field of Search ........................... 177/210 EM, 212, 177/229; 73/862.472, 862.634, 862.639, 1.13, 1.15

(56) References Cited

U.S. PATENT DOCUMENTS

| | | | |
|---|---|---|---|
| 4,799,561 | * | 1/1989 | Komoto ............................. 177/229 |
| 4,813,505 | * | 3/1989 | Solder et al. ....................... 177/212 |
| 5,340,951 | * | 8/1994 | Hungerbuhler et al. ............. 177/229 |
| 5,641,948 | * | 6/1997 | Burkhard ............................ 177/229 |
| 5,719,357 | * | 2/1998 | Eger et al. .......................... 177/229 |
| 5,771,986 | * | 6/1998 | Kohn et al. .................. 177/210 EM |
| 5,866,854 | * | 2/1999 | Emery et al. ................ 177/210 EM |
| 5,923,000 | * | 7/1999 | Tschopp et al. .................... 177/229 |
| 6,232,567 | * | 5/2001 | Bonino et al. ............... 177/210 EM |

FOREIGN PATENT DOCUMENTS

| | | |
|---|---|---|
| Off 41 19 734 A1 | 12/1992 | (DE) . |
| 43 05 425 A1 | 8/1994 | (DE) . |
| Geb 298 09 833 U1 | 9/1998 | (DE) . |

* cited by examiner

*Primary Examiner*—Randy W. Gibson
(74) *Attorney, Agent, or Firm*—Lawrence E. Laubscher

(57) ABSTRACT

In a weighing cell a load receiver is constrained in a mode of planar translatory motion in relation to a stationary part (1). The stationary part (1), configured in the shape of a solid H-profile, has two side plates (3) to which the guide links of a parallelogram mechanism are attached. A base plate (2) connects the side plates (3) and supports the parts, that are required for transmitting a force to be measured from the load receiver to a measuring cell. The force-transmitting parts can be configured either as a monolithic material block or as individually assembled components. (FIG. 1)

28 Claims, 13 Drawing Sheets

US 6,326,562 B1

FORCE-MEASURING APPARATUS, PARTICULARLY A WEIGHING CELL

BACKGROUND OF THE INVENTION

1. Field of the Invention

The present invention concerns a force-measuring apparatus, particularly a weighing cell, with a load receiver for receiving the force that is to be measured and a force-transmitting device for transmitting at least a partial amount of the force to be measured from the load receiver to a measuring transducer that delivers a signal corresponding to the force to be measured. The load receiver is guided in planar translatory motion in relation to a stationary part of the force-measuring apparatus by two parallelogram guides (guide links) that extend in two mutually parallel planes, are rigid with regard to deformation within their respective planes and have elastic flexibility in the transverse direction of the planes. Each of the two parallelogram guides is connected at one end (with respect to its lengthwise direction) to the load receiver and at the opposite end to the stationary part of the force-measuring apparatus. A parallelogram plane is defined by the lengthwise direction of the guides and the path of motion traveled by the load receiver. The force-transmitting device has at least one force-transmitting lever that receives its input force through a coupling from the load receiver and is rotatable in relation to a fulcrum axis that is fixed on a support portion of the stationary part extending between the two parallelogram guides in a plane that is parallel to the common plane of the parallelogram guides.

2. Description of the Related Art

It is a known design concept for weighing cells of this kind to be assembled from numerous individual components that need to be either rigidly attached to or movably pivoted at the stationary part. In particular, the pivot points of the parallelogram guides and the lever are located on the stationary part. Positional changes of these pivot points that are caused by the force to be measured will impair the measuring accuracy. Therefore, the stationary part needs to have a particularly high degree of structural rigidity.

It is also a known concept (DE 41 19 734 A1) to configure the stationary part, the parallelogram guides, the load receiver and the lever as a continuum of interconnected material portions of a monolithic material block, whereby in particular the assembly process of the corresponding separate components is eliminated. However, the separation of the individual material portions from the material block, e.g., by the method of spark erosion, represents a relatively exacting procedure, particularly in the case where the apparatus will have to meet a high level of measuring accuracy and, therefore, the thinned-down material domains by which the material portions are movably connected have to be formed with a commensurate degree of precision.

SUMMARY OF THE INVENTION

The object of the present invention is to provide a force-measuring apparatus of the kind described at the beginning, composed of only a small number of simple parts and offering a satisfactory level of measuring accuracy.

According to the invention, this problem is solved by configuring the stationary part in the shape of a base plate that forms the support portion. Two side plates, perpendicular to the plane of the base plate, extend along the borders of the base plate that run in the lengthwise direction of the parallelogram guides. The parallelogram guides at their stationary ends (i.e., the far ends from the load receiver) are anchored on the side plates.

The concept of a base plate and transversely extending side plates results in an exceptional degree of rigidity in the stationary part. At the same time, this shape of the stationary part offers a simple way of anchoring the ends of the parallelogram guides. The latter extend on both sides of and parallel to the base plate from their stationary ends (where they are anchored to the base plate) to their opposite, movable ends (where they are connected to the load receiver). Due to their elastic flexibility, they form a parallelogram linkage to guide the load receiver. The parallelogram plane (i.e., the kinematic plane of the motion of the load receiver) is perpendicular to the planes of the parallelogram guides and of the base plate and runs in the lengthwise (end-to-end) direction of the parallelogram guides. Given that the stationary part has a high resistance to deformation, the corner points of the parallelogram linkage will not be displaced under a load, which is beneficial for the measuring accuracy. At the same time, the stationary part has a simple shape so that its manufacture is relatively uncomplicated.

In an advantageous embodiment of particular simplicity, the base plate and the associated side plates are formed as a section of an integral, monolithic H-profile in which the transverse web segment of the H-profile represents the base plate and the two parallel segments of the H-profile represent the side plates. An H-profile of this kind may be produced by a simple process, e.g., as an extruded profile or a pressure casting.

Further in the interest of a simple design configuration, the side plates in a practical embodiment have border surface areas parallel to the planes of the parallelogram guides where the stationary ends (i.e., the far ends from the load receiver) of the parallelogram guides are attached. This is also particularly advantageous if, as in most cases, the bending flexibility of the parallelogram guides is realized by means of flexural pivots (flexures, for short) that form the ends of the parallelogram guides and have a virtual pivotal axis located between two flat attachment terminals. In this case, the parallelogram guides each have two flexures at the ends where the parallelogram guides are attached to the stationary part, with the attachment terminals extending parallel to the plane of the parallelogram guide. The attachment terminals on the side of the stationary part lie flat against and are attached to the parallel border surfaces of the side plates. The attachment terminals of the same flexures but on the opposite side of the virtual pivotal axis are attached to a rigid, plate-shaped portion of the parallelogram guide.

It is also within the scope of the invention that at least one of the side plates has a slit extending at least through the portion next to the place where one of the parallelogram guides is attached, the width of the slit being adjustable in the direction transverse to the plane of the parallelogram guides. By adjusting the width of the slit, e.g., by means of an adjustment screw acting on the slit, it is possible to vary the distance between the parallelogram corner next to the respective point of attachment and its neighboring corner in the transverse direction to the plane of the parallelogram guides. This allows the corrective adjustment of so-called corner-load errors that occur in particular if the force to be measured is introduced asymmetrically into the load receiver, i.e., not centered along a symmetry axis extending in the direction of the displacement.

In a further practical embodiment of the invention, the lever is rotatably constrained on the stationary part by at least one flexure with two attachment terminals and a virtual pivotal axis located between them, where one attachment terminal is fastened to the stationary part, the other attachment terminal is fastened to the lever, and the virtual pivotal axis constitutes the lever fulcrum. In this arrangement, the flexure constitutes an immediate rotatable constraint of the lever to the stationary part where, due to the shape of the stationary part, a suitable attachment surface can be made available without a problem.

This fulcrum constraint of the lever is configured to particular advantage in an embodiment of the invention where the two side plates of the stationary part each have a frontal attachment area extending in a plane perpendicular to the lengthwise direction of the parallelogram guides, with the fixed, stationary end of a flexure fastened to each attachment area, and where the lever has a pivotal portion extending between and fastened to the opposite, flexing ends of the flexures. In this arrangement, the pivotal portion of the lever extends across the entire width of the stationary part as measured from one side plate to the other and thus requires a particularly sturdy form of construction that takes advantage of the overall shape of the stationary part.

This embodiment may be further developed in such a way that the pivotal portion is arranged in front of the load receiver, i.e., when looking in the lengthwise direction of the parallelogram guides from the movable, load-receiver ends of the parallelogram guides towards their opposite ends where they are attached to the stationary part. With this arrangement, the greatest amount of space is available for the useful lever length in the lengthwise direction of the parallelogram guides. Also, the attachment terminals of the flexures are openly accessible and easy to install.

As an alternative, the pivotal portion may be arranged to the rear of the load receiver, i.e., when looking in the lengthwise direction of the parallelogram guides from the movable, load-receiver ends of the parallelogram guides towards their opposite ends where they are attached to the stationary part. With this arrangement, the entire space in front of the pivotal portion of the lever is available for the load receiver so that the latter may be of a particularly sturdy design.

According to another inventive idea, the device for transmitting the force to be measured comprises a monolithic material block that is traversed by material-free free spaces extending transverse to the parallelogram plane (the latter being defined by the lengthwise direction of the parallelogram guides and the travel direction of the load receiver). The material-free spaces delimit a material portion that is anchored on the base plate of the stationary part, another material portion forming the lever, and a thinned-down material connection between the two in the form of an elastically flexible domain representing the fulcrum pivot of the lever.

This embodiment eliminates the need for assembling a separate flexural pivot for the fulcrum support because the lever, the elastically flexible portion and the material portion mounted on the base plate are integrally connected to each other. The flexural domain being formed in one integral piece together with the lever has the advantage that no screw connections are necessary. Also, the material block and the material portions delimited within it can be very small and compact. In addition, the areas that are critical for the measuring accuracy, particularly the flexural fulcrum of the lever, can be produced with narrow tolerances.

In a practical further development of this embodiment, a portion of the material block is delimited by a material-free space traversing the block perpendicularly to the parallelogram plane and thereby forming a coupling member. At its one end, the coupling member is integrally connected to the lever arm that takes up the force from the load receiver. The opposite end of the coupling member is attached to the load receiver. In this arrangement, the coupling member for the connection to the lever, too, hangs together with the lever as one single piece, which enhances the simplicity of the design. The end of the coupling member nearest the load receiver is attached to the latter with one or more screws. The coupling member is rigid in the direction of the force to be transmitted by it while being elastically flexible in the perpendicular direction in the parallelogram plane so that it can yield to the deflections of the load receiver and the lever. The elastic flexibility is provided by thinned-down flexural domains in the areas where the coupling member meets the lever and the load receiver, respectively. The flexural domains can be produced to a narrow tolerance through an appropriate design of the material-free space in the material block, which is advantageous for the measuring accuracy.

If necessary, the device for transmitting the force to be measured may also comprise a further material-free space traversing the material block in the perpendicular direction to the parallelogram plane in such a way that at least one material portion is delineated in the form of a further lever that works in sequence after the (first) lever, and another material portion is delineated in the form of a further coupling member whose one end hangs together with an arm of the further lever and whose opposite end hangs together with the arm of the first lever that points away from the load receiver. The further lever provides an additional level of force reduction in case a sufficient reduction ratio cannot be achieved with a single lever because of spatial constraints or considerations of structural strength. In an analogous way, one or more additional levers could be arranged in sequence after the further lever, in case this were required.

It is particularly advantageous in all single-block embodiments of the force-transmitting device of the kind described above that at least a part of the material-free spaces are in the form of only a thin linear cut traversing the material block. Given that only very small amounts of displacement travel are required for the movable parts of the material block, the width of the thin linear cuts can be very small. The preferred method for producing thin linear cuts of this kind is by the process of spark erosion. By minimizing the dimensions of the material-free spaces, the volume available for the material portions delimited by them is maximized, which increases the flexural stiffness of the force-transmitting parts that are formed out of these material portions, whereby the measuring accuracy is enhanced.

In the embodiments described here, as a practical means for connecting the stationary part of the force-measuring apparatus with the device for transmitting the force to be measured, the material portion by which the device is attached to the base plate has a contact surface in form-fitting engagement with a surface area of the base plate and is firmly attached to the base plate by means of at least one screw bolt that extends parallel to the parallelogram plane. This requires no more than one bore hole per bolt in the material portion by which the device is attached to the base plate. The bolt(s) may be anchored in a tapped hole (tapped holes), e.g., in the base plate, with the bolt shaft(s) passing through the hole(s) of the attached material portion and the bolt head(s) tightened against an appropriate contact area of the attached material portion.

In a possible design alternative, the material portion by which the device is attached to the base plate, likewise, has a contact surface in form-fitting engagement with a surface area of the base plate. By means of at least one screw bolt that extends transverse to the parallelogram plane, the attached material portion is fastened to at least one attachment part that is connected to and stands out perpendicularly from the base plate. In contrast to the embodiment of the preceding paragraph, the at least one bolt passes through its associated hole in the attached material portion not in a parallel direction but rather in the perpendicular direction to the parallelogram plane.

In a further practical design alternative, the material portion by which the device is attached to the base plate has a contact surface in form-fitting engagement with a surface area of the base plate facing towards one of the parallelogram guides and also with an adjoining frontal surface area of the base plate extending transverse to the plane of the parallelogram guides. The attached material portion is fastened tightly to the base plate by means of at least one screw bolt that traverses the frontal surface area. In this arrangement, it is practical if the aforementioned surface area of the base plate faces against the direction of the force to be measured that is applied to the load receiver so that the force to be measured adds to the contact pressure between the attached material portion and the base plate. The screw bolt for the frontal attachment extends parallel to the plane of the base plate as well as to the parallelogram plane.

In a very advantageous configuration of the device for transmitting the force to be measured, the material block (as seen in the parallelogram plane) is L-shaped; the coupling member connecting the lever to the load receiver is formed in the part of the L that extends parallel to the load receiver; and the lever is formed in the part of the L that extends parallel to the plane of the base plate. Using this L shape permits the contact surface for the attachment to be realized in a particularly simple way in all of the embodiments. The L shape also takes into account that the lever and the coupling member extend at a right angle to each other and, therefore, the configuration of the lever and the coupling member in the two legs of the L minimizes the amount of material required for the material block.

The invention further includes the concept of attaching the measuring transducer to the base plate. The shape and rigidity of the base plate of the stationary part are ideally suited to support the measuring transducer and to assure and maintain its precise position in a simple manner. In many cases, the measuring transducer is an electromagnetic force compensation system. In a system of this kind, a permanent magnet that includes a magnet yoke is attached to the base plate. A compensation coil that is connected to a lever of the force-transmitting device and carries the flow of compensating current is immersed in the air gap of the magnetic circuit formed by the permanent magnet and the magnet yoke. The measuring transducer is equipped with a position sensor that monitors the position of the compensation coil within the magnetic field and generates a position-related signal by which the compensating current is regulated so that the compensation coil is held at its null position when a force is applied to the load receiver. Thus, the strength of the compensating current represents a measure for the size of the force that is to be determined.

Also, according to a further aspect of the invention, a support element attached to a surface area of the base plate includes a column extending at a right angle to the base plate and passing with clearance through an opening in the parallelogram guide that faces said surface area. This support element, serving as the stationary mounting base for the supporting portion of the force-measuring apparatus, can be attached to the chassis plate of a balance housing, e.g., at the opposite end of the support element, from where the latter is attached to the base plate. This concept of the support element provides a very sound arrangement for taking up the reactive forces when the force to be measured is applied.

Another inventive embodiment presenting a sturdy and simple configuration of the force-measuring apparatus is distinguished in that the load receiver, the parallelogram guides and the stationary part are formed as integrally connected portions of a material piece of rectangular hollow-profile: cross-section. The side plates are formed by portions of two mutually parallel side walls of the hollow profile. The base plate extends from one side wall to the other; it runs parallel to and is spaced at a distance between the transverse walls that connect the side walls of the hollow profile. The parallelogram guides are delimited in the hollow-profile piece by slits traversing the walls of the hollow profile in the lengthwise direction of the parallelogram guides. Thinned-down domains are formed in the hollow-profile piece that run in the transverse direction within the planes of the parallelogram guides from the ends of one slit to the corresponding ends of the other. These thinned-down domains function as flexural pivots at the ends of the parallelogram guides. The load receiver is delimited against the stationary part by transverse slits in the hollow-profile piece running perpendicular to the longitudinal direction.

This embodiment of the invention is particularly well suited for loads in the range of several hundred kilograms. In a simple manufacturing process, a hollow profile of a wall thickness adapted to the desired maximum loading strength is extruded and subsequently cut into the hollow-profile material pieces. The lengthwise and transverse slits for delimiting the parallelogram guides and the load receiver, as well as the grooves for the thinned-down domains, may be formed by basic milling and/or drilling operations either before or after the cutting. As the only remaining assembly step, the device that transmits the force to be measured from the load receiver to the measuring transducer is mounted in the hollow-profile piece and coupled to the load receiver.

In this context, as a practical constructive embodiment of the fundamental inventive principle, the lengthwise slits delimiting the parallelogram guides are formed in the transverse walls of the hollow profile. Thus, in particular the lengthwise slits can be arranged in the transverse walls in such a manner that the side where each slit adjoins the respective side wall is flush with the inner surface of that side wall. As an alternative design choice, the lengthwise slits delineating the parallelogram guides may be formed in the side walls. In this design version, the particular arrangement of the lengthwise slits is such that the side where each slit adjoins the respective parallelogram guide is flush with the inner surface of the transverse wall within which the respective parallelogram guide is formed.

It also helps to simplify the manufacturing process that in a further embodiment each of the thinned-down domains is bounded between a pair of grooves in the hollow-profile piece that are transversely opposite each other across the plane of the respective parallelogram guide. In a cross-section perpendicular to the plane of the parallelogram guides, the grooves have convex curvatures towards each other. The grooves extend parallel to the plane of the parallelogram guide and transverse to the longitudinal axis of the hollow-profile piece and can be formed, e.g., by drilling and/or milling.

As a further inventive feature, the stiffness of the flexures formed by the thinned-down domains can be made adjustable by providing cutouts traversing the hollow profile at a right angle to the plane of the parallelogram guides in the vicinity of the thinned-down domains. The length of the thinned-down domains transverse to the lengthwise direction of the parallelogram guides is given by the distance of the cutouts from the lengthwise slits. The length and thickness of the thinned-down domains determine the cross-sectional areas of the material connections where the parallelogram guides hang together at one end with the stationary part and at the other end with the load receiver. By further taking into account the properties of the material used for the hollow-profile piece, the stiffness of the flexures is quantitatively defined.

Furthermore, the embodiments that are based on the concept of a hollow-profile piece may be practically configured in such a way that the two side walls are extended beyond the outside surface of the transverse wall facing in the direction of the load-induced displacement of the load receiver. This allows the force-measuring apparatus to be attached by the extensions of the side walls to a chassis plate, e.g., of a balance housing. In this arrangement, the extensions provide sufficient clearance between the chassis plate and the adjacent parallelogram guide for the displacement travel of the load receiver when a load is applied.

In the embodiments discussed so far, at least the parallel-guiding mechanism on one hand and the force-transmitting device between the load receiver and the measuring transducer on the other hand are configured as separate units. This offers the advantage that the parallel-guiding mechanism especially for larger load capacities can be designed to have commensurate strength and sturdiness while the force-transmitting device can be configured independently to match the smaller forces that it is subjected to with a lighter but more precise design. However, an assembly process is necessary for putting together the separate units. In accordance with another aspect of the invention, the assembly phase is avoided in that the load receiver, the parallelogram guides, the stationary part and the lever are formed as monolithically interconnected material portions of a rectangular material block in which the material portions are delimited by material-free spaces traversing the material block at a right angle to the parallelogram plane. In the dimension transverse to the parallelogram plane, the material block is wider in the areas of the parallelogram guides and their delimiting material-free spaces than in the area of the lever. This gives a greater amount of strength to the parallelogram guides, which carry the greatest internal forces, while the smaller thickness of the lever portion reduces the amount of work required to form the lever. Due to their increased strength, the parallelogram guides have a greater rigidity against warping under eccentric loading conditions. This proves to be effective in preventing measuring errors caused by eccentric loading.

The preferred way of applying this design concept in practice is to use a material block with an H-shaped profile. In a cross-sectional plane transverse to the parallelogram plane, the two legs of the H (the flanges of the H-profile) represent the areas of greater material width and the connector section between the legs (web segment) represents the area of reduced material width. A particularly simple process for producing a material block of this shape consists of extruding H-profiled bars of greater length and cutting them into sections of the length required for the material blocks.

Particularly preferred are embodiments in which the material-free portions delimiting the load receiver, the parallelogram guides and the stationary part are at least in part formed only by thin linear cuts. This allows the interstices between the individual components to be as narrow as is optimally desirable, at least in the areas where this is relevant, so that the apparatus can be accommodated within a reduced amount of space in relation to a given load capacity, or the load capacity may be increased in relation to a given design volume. Detailed illustrations and descriptions are presented in the German patent application P 41 19 734.8 that was filed by the same applicant on Jun. 14, 1991 and also formed the basis for the European patent application EP 92 109 385, and further in the German patent application P 196 05 087 filed Feb. 12, 1996. The relevant features disclosed in these earlier applications are herewith included by reference.

In a preferred further development, the support portion of the stationary part lies adjacent to one of the two parallelogram guides directly across one of the material-free spaces. At the same time, the (first) lever that is coupled to the load receiver lies adjacent to the other of the two parallelogram guides directly across another of the material-free spaces. In this arrangement, the portion of said lever that is nearest to the adjacent parallelogram guide falls within the area of increased width of the material block, which also increases the strength of the lever. This is particularly advantageous where the force introduced from the load receiver into the lever is large and where only the subsequent levers carry a lighter load due to the lever-reduction of the first lever. This train of reasoning, too, is extensively discussed in the aforementioned earlier applications.

In a further practical evolution of this embodiment, the material-free space delimiting the first lever on the far side from the adjacent parallelogram guide extends in the area of reduced width of the material block. This allows further parts of the force-transmitting device to be formed immediately next to the first lever in the reduced-width area, e.g., one or more subsequent levers of a lever series as described in the aforementioned earlier applications.

Further distinctive features, details and advantages of the invention will become evident from the following description and from the drawing that is also being referred to for the disclosure of all details essential to the invention that are not expressly mentioned in the text.

DETAILED DESCRIPTION OF THE INVENTION

Figure 1:
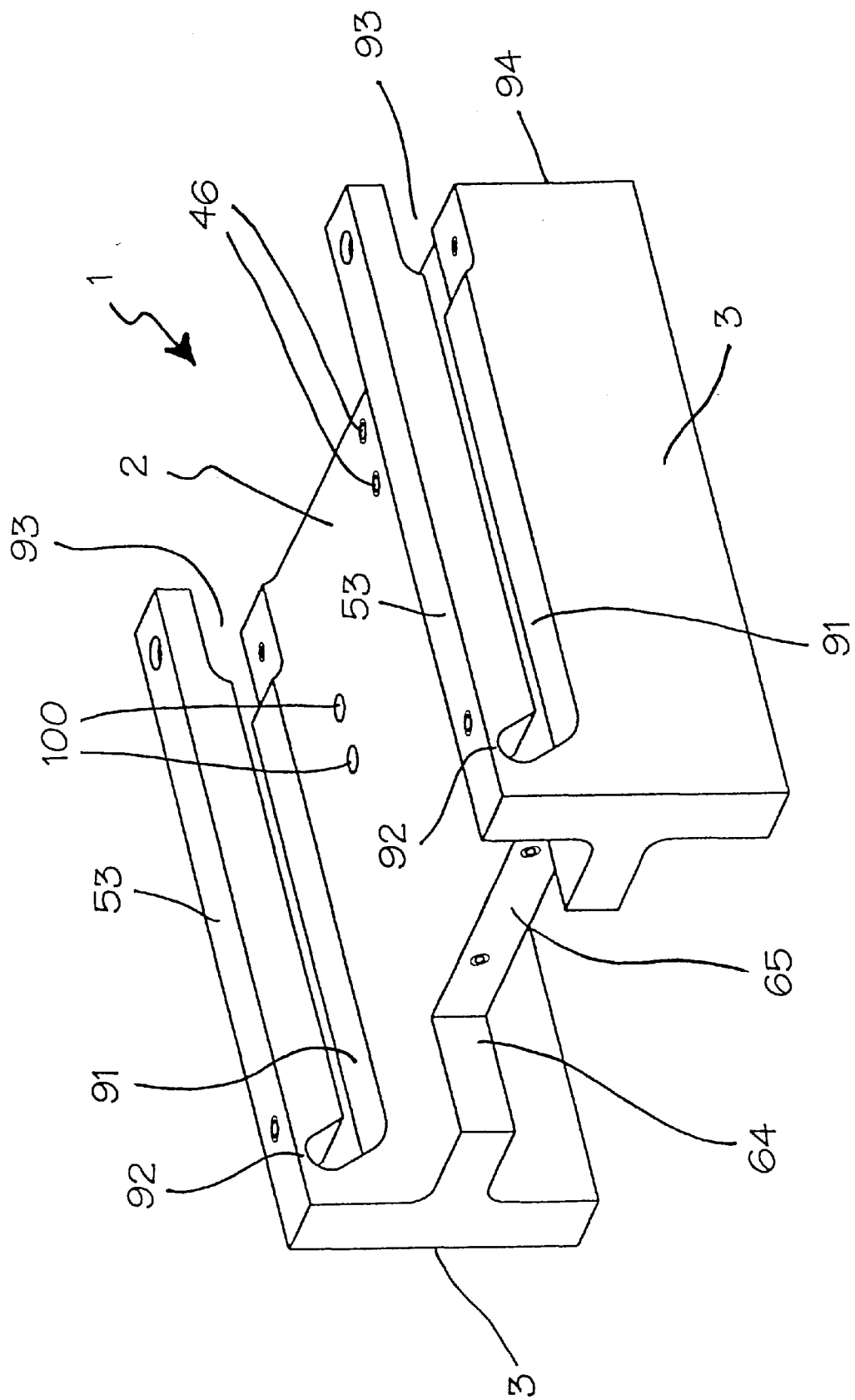
FIG. 1 represents a perspective view of a stationary part of a weighing cell.
Figure 3:
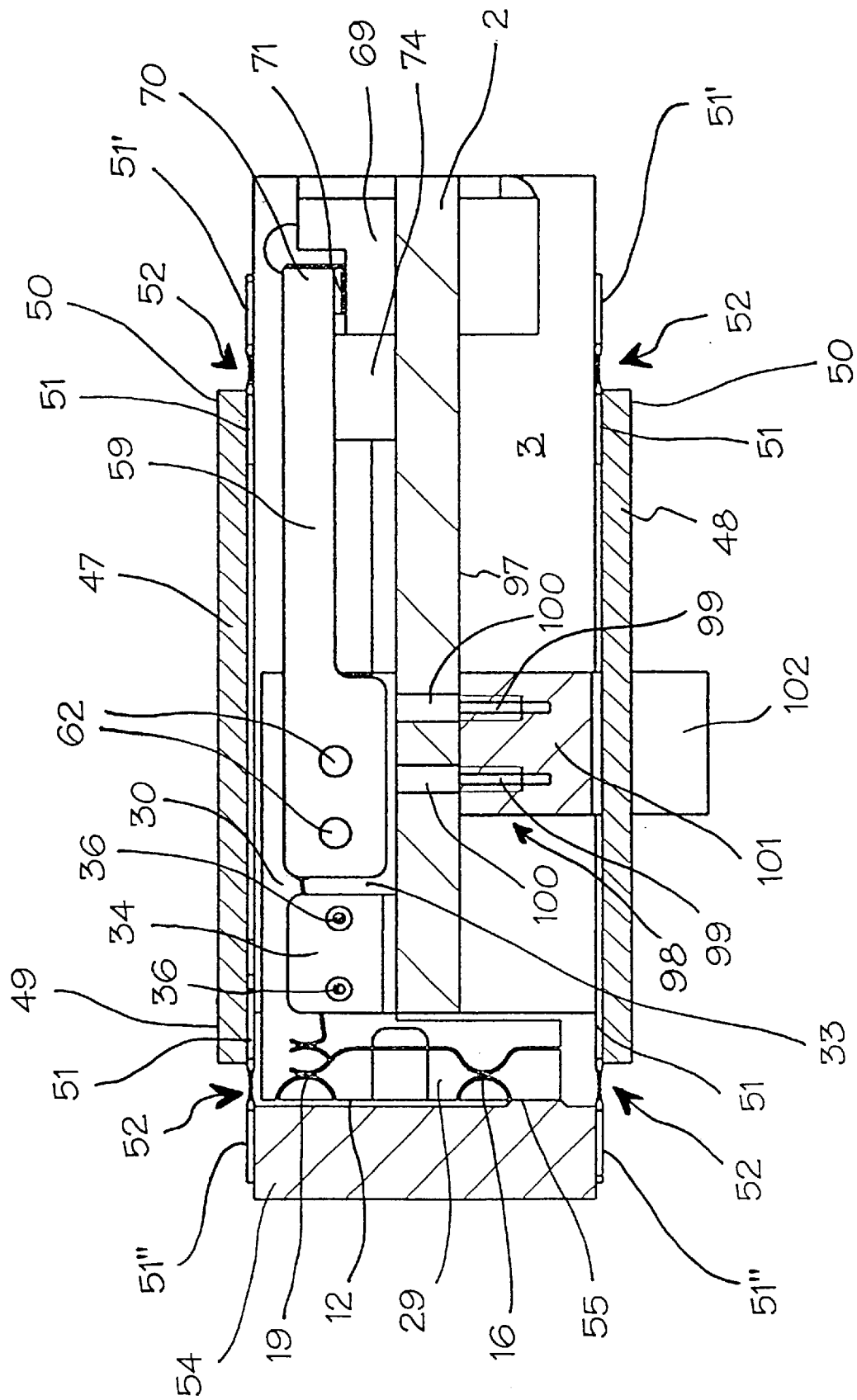
FIG. 3 represents a partially sectional view of a weighing cell assembled from the parts shown in FIGS. 1 and 2.

In a weighing cell as shown in a partially sectional view in FIG. 3, the stationary part 1 is made of a section of H-profile stock as illustrated in the perspective view of FIG. 1. A plane base plate 2 represents the transverse web segment of the H-profile. Two essentially rectangular side plates 3, representing the vertical flange segments of the H-profile, extend along two parallel borders of the base plate 2. In the illustration of FIG. 3, the side plate 3 closer to the viewer has been cut away and, therefore, only the side plate 3 farther from the viewer and a sectional representation of the base plate can be seen in FIG. 3. By choosing an appropriate material thickness for the base plate 2 and the side plates 3, the stationary part is given a high degree of structural stiffness.

Figure 2:
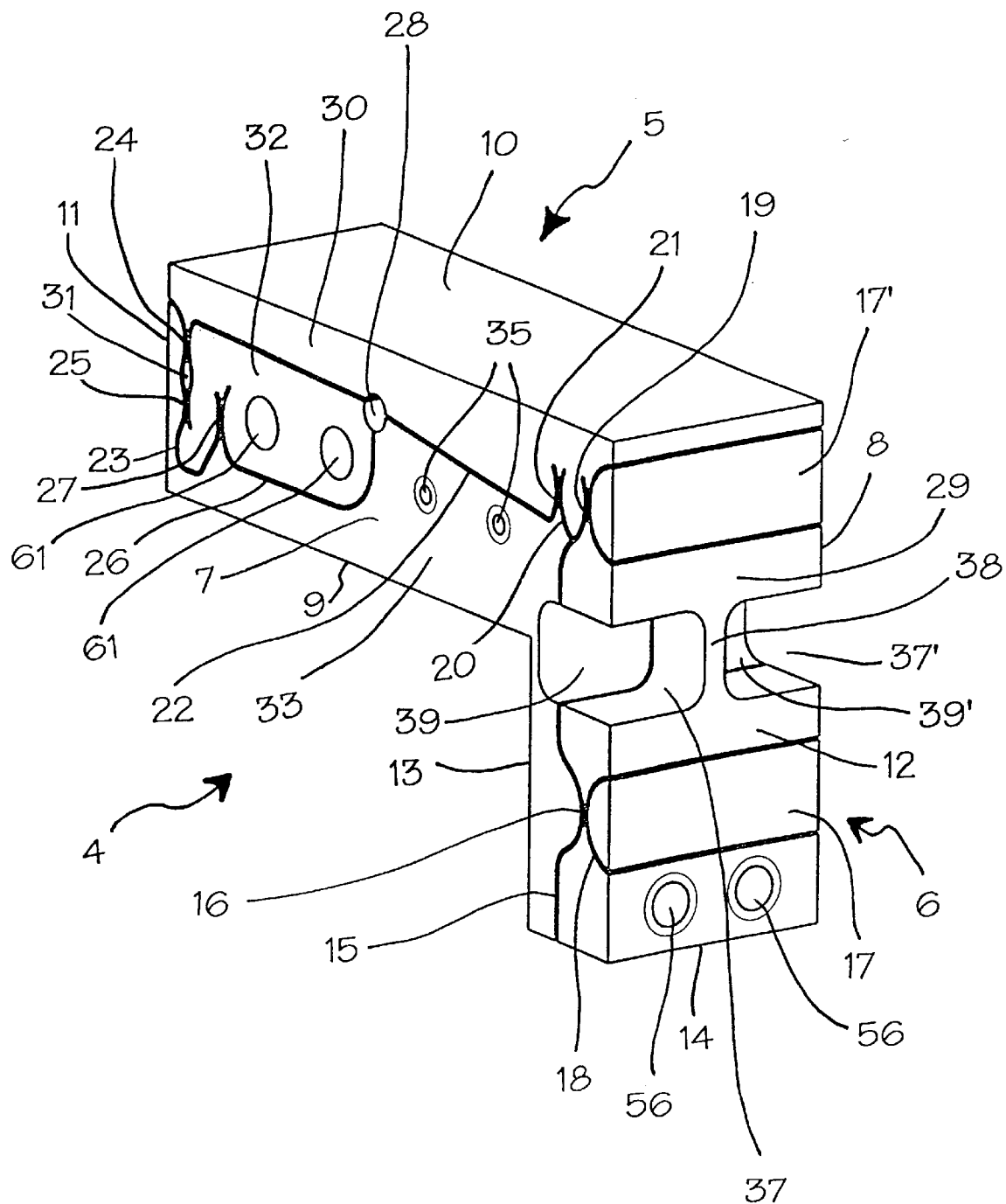
FIG. 2 represents a perspective view of a device for transmitting a force to be measured that is formed out of monolithic material block.

A monolithic material block 4 of a device for transmitting the force to be measured, as shown in perspective in FIG. 2, is mounted on the base plate 2 midway between the side plates 3. Seen in a parallel plane to the side plates -3, the material block 4 is L-shaped with the two legs 5 and 6 of the L being confined between two lateral boundary planes 7, 8. In addition, the leg 5, oriented horizontally in FIG. 2, is delimited between and perpendicular to the two lateral boundary planes 7, 8 by a plane bottom surface 9, a parallel plane top surface 10, and also an end surface 11 perpendicular to the bottom surface 9 and top surface 10. The vertical leg 6 of the L, which hangs together with the horizontal leg 5, is delimited between and perpendicular to the two lateral boundary planes 7, 8 by a plane front surface 12, a parallel plane rear surface 13 and also an end surface 14 parallel to the bottom surface 9 of the horizontal leg 5.

As indicated in FIG. 2 by a bold line, a thin linear cut 15 in the vertical leg 6 of the L traverses the material block 4 at a right angle to the lateral boundary surfaces 7, 8. Starting from the bottom end surface 14, the thin linear cut 15 runs at first parallel to the rear surface 13, then curves out towards the front surface 12 where its convex shape delimits one side of a thinned-down material portion 16. On the side of the front surface 12, the thinned-down domain 16 is delineated by a convex curve that is the mirror-opposite of the convex shape of the thin linear cut 15 and is formed by the removal of a cylinder-segment shaped material portion 17 from the front surface 12. For clarity, the material portion 17 in FIG. 2 is drawn as part of the material block 4, although the material portion is totally separated by the thin linear cut 18 and removed in the finished state of the device. Continuing after the curve that delineates the thinned-down domain 16, the thin linear cut 15 runs parallel to the rear surface 13 for some distance and then, near the top surface 10, again curves out towards the front surface 12 where its convex shape delimits one side of a further thinned-down domain 19. On the side of the front surface 12, the further thinned-down domain 19 is delineated by a convex curve that is the mirror-opposite of the convex shape of the thin linear cut 15 and is formed by the removal of a cylinder-segment shaped material portion 17' analogous to the material portion 17. Like the latter, the material portion 17' for the sake of clarity is shown in FIG. 2 in its non-removed state.

At the transition from the rectilinear segment of the thin linear cut 15 to the curved segment delineating the further thinned-down domain 19, a further thin linear cut 20 branches off from the thin linear cut 15 and mirrors the convex-curved shape of the latter. The thin linear cut 20 delineates one side of a thinned-down domain 21, whose other side (facing in the direction towards the end surface 11 of the leg 5) is delineated by a mirror image-like convex curve of a thin linear cut 22. The convex-curved section of the thin linear cut 22 is adjoined by a straight section extending lengthwise through the L-leg 5 into t-he vicinity of the end surface 11 and converging slightly towards the top surface 10. Near the end surface 11, the thin linear cut 22 changes direction along a bend whose convex curvature faces towards the end surface 11, then continues through a straight section parallel to the end surface 11 and ends in another convex-curved section facing towards the end surface 11. The latter two curves and straight section of the thin linear cut 22 have their mirror-opposites in two curves and an intermediate straight section of a thin linear cut 23 that starts out from the end surface 11. The two opposite pairs of curves of the thin linear cuts 22 and 23 delimit thinned-down domains 24, 25 that are aligned in parallel with the end surface 11. Continuing after the thinned-down domain 25 that is nearer to the bottom surface 9 of the L-leg 5, the thin linear cut 23 turns back into a direction towards the top surface 10 and ends in a bend with a convex curvature facing towards the front surface 12. The latter curve has its mirror-opposite in a convex-curved terminal segment of a thin linear cut 26. The pair of opposite convex-curved segments delineate a thinned-down domain 27. Continuing after the convex-curved segment that delimits the thinned-down domain 27, the thin linear cut 26 runs for a stretch in the direction towards the front surface 12, then turns towards the top surface 10 and finally terminates in a bore hole 28 at the thin linear cut 22. The bore hole 28 serves to insert and remove a spark erosion wire that is used to produce all of the thin linear cuts of the material block 4.

The thin linear cuts 15, 18, 20, 22, 23 and 26 constitute narrow material-free gaps across the material block 4 by which different material domains are delimited. Thus, the thin linear cut 15 and the front surface 12 of the L-leg 6 (after removal of the material portions 17, 17') delimit a material portion serving as coupling member 29. The thinned-down domains 16, 19 acting as flexural pivots allow the coupling member 29 to flex elastically in a parallel plane to the lateral boundary surfaces 7, 8. The thinned-down domain 19 connects the coupling member 29 to a material portion that is delimited between the thin linear cut 22 and the top surface 10 of the L-leg 5 and serves as lever 30. The (virtual) fulcrum axis of this lever is represented by the thinned-down domain 21. At the opposite lever end from the thinned-down domain 19, i.e., in the area of the thinned-down domain 24, the lever 30 is connected to the material portion that forms a further coupling member 31 delimited by the thin linear cuts 22 and 23 between the thinned-down domains 24 and 25.

A further lever 32 is formed by the material portion that is bounded by the segment of the thin linear cut 23 extending from the thinned-down domain 25 to the thinned-down domain 27, the thin linear cut 26, and the segment of the thin linear cut 22 extending from the bore hole 28 to the thinned-down domain 24. Apart from the levers 30, 32, a material portion 33 for anchoring the device on the base plate 2 is formed by the portion of the L-leg 5 between the levers 30, 32 and the bottom surface 9 and by the portion of the L-leg 6 between the coupling member 29 and the rear surface 13.

All of the thinned-down domains 16, 19, 21, 24, 25 and 27 represent flexural pivots by which virtual pivotal axes are defined for the relative rotational displacement between the material portions that hang together through the respective thinned-down domains. The spatial configuration is purposely arranged so that the pivotal points defined by the thinned-down domains 19, 21 and 24 are located on a straight line, meaning that the force-introduction points defined by the virtual pivotal axes of the thinned-down domain 19 and 24 are lined up in a straight line with the virtual pivotal axis defined by the thinned-down domain 21.

In the embodiment of FIG. 3, the bottom surface 9 (see FIG. 2) of the material portion 33 that is anchored on the base plate 2 serves as contact surface for the form-fitting engagement with the surface area of the base plate 2 that faces towards the material block 4. For the centered attachment of the material block 4 in relation to the two side plates 3, mounting parts 34 extend parallel to the two lateral boundary surfaces 7, 8 of the material block 4 (FIG. 2). The mounting parts 34 are connected to the base plate 2, standing off perpendicularly from it. The mounting parts 34 and the lateral boundary surfaces 7, 8 facing towards them are spaced apart by space holders (not shown). In the area of the space holders, the anchored material portion 33 has two bore holes 35 running perpendicular to the lateral boundary surfaces 7, 8 (FIG. 2). The material block 4 is fastened to the base plate 2 by two screw bolts 36, passing through the bore holes 35 and matching holes in the mounting parts 34.

Figure 4:
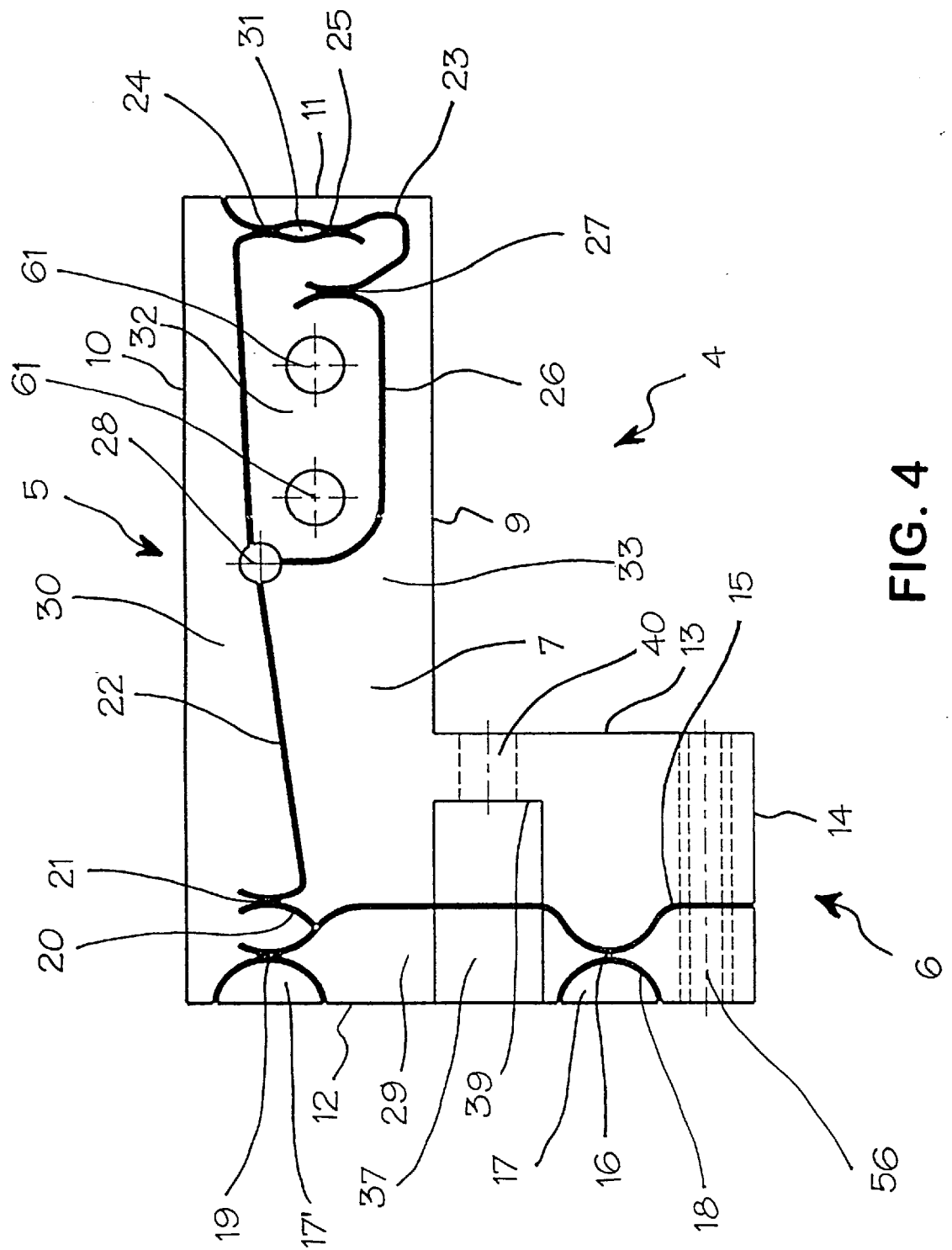
FIG. 4 represents a side view of a slightly modified version of the device of FIG. 2 for transmitting the force to be measured.
Figure 5:
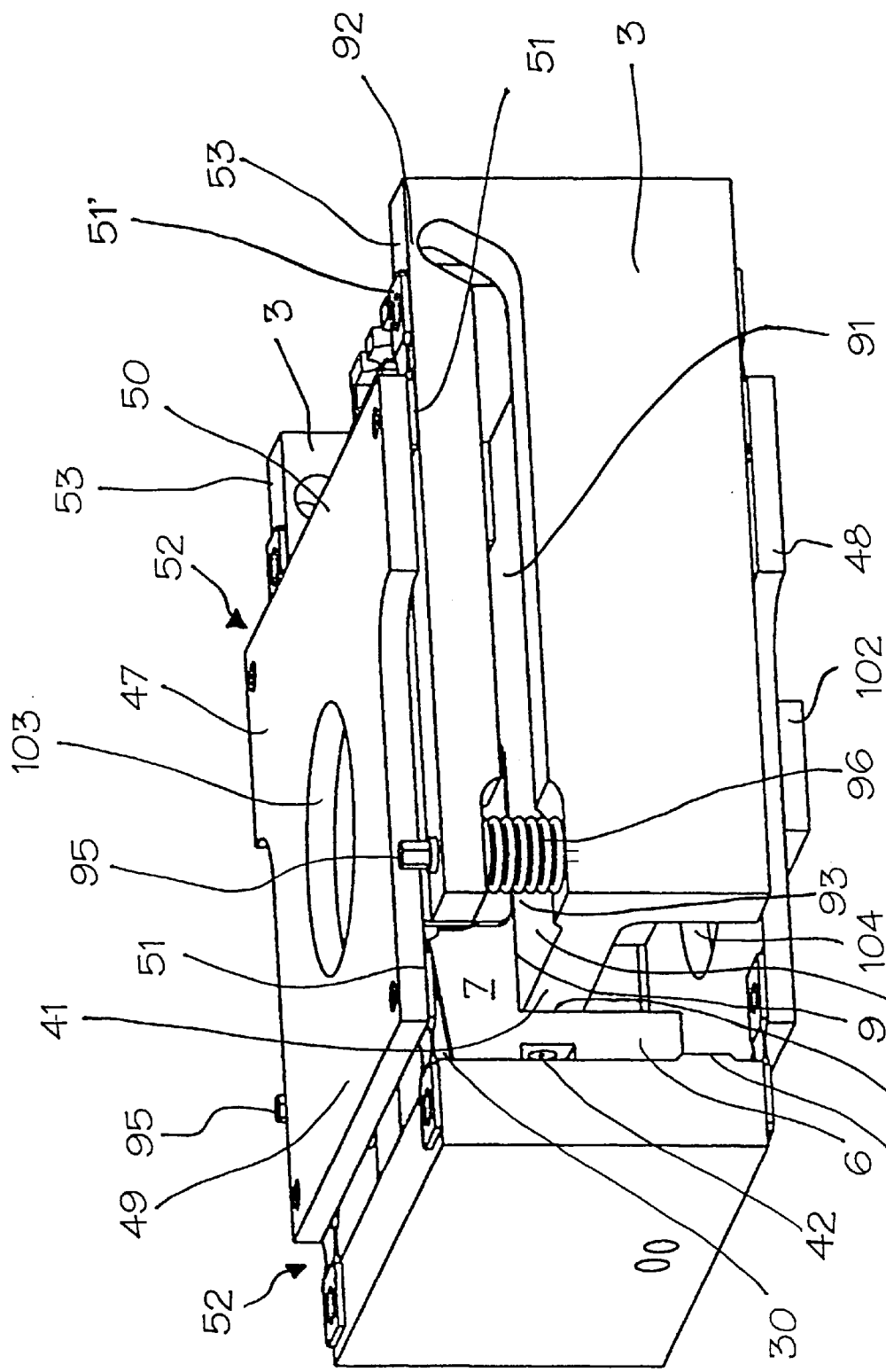
FIG. 5 represents a perspective view of the weighing cell with the device of FIG. 4 installed in it.

Instead of the arrangement of FIG. 3 for mounting the material block 4 of FIG. 2 on the base plate 2 of the weighing cell, an alternative mounting arrangement is shown in FIGS. 4 and 5. The material block of FIG. 4 corresponds entirely to the material block 4 of FIG. 2 with respect to the shape of the material block and the way in which the material portions forming the levers 30, 32 and the coupling members 29, 31 are delimited by the thin linear cuts 15, 18, 20, 22, 23 and 26. Therefore, the corresponding parts in FIG. 4 have the same reference numbers as in FIG. 2. With respect to these reference numbers, the description given for FIG. 2 also serves as reference for FIG. 4.

The only difference is in the way the material block 4 is fastened to the base plate 2. Still in agreement with FIG. 2, the embodiment of FIG. 4 has the same configuration of the coupling member 29 as in FIG. 2. The configuration is also identical with regard to the adjacent portion of the L-leg 6 where two recesses 37, 37' extend symmetrically (in relation to the parallel mid-plane between the two lateral boundary planes 7, 8 of the material block 4) from the front surface 12 in the direction towards the rear surface 13 of the leg 6. The recesses 37, 37' delineate in the coupling member 29 a narrow web segment 38 extending in the mid-plane and providing the coupling member with an elastic flexibility allowing it to bend transversely in relation to the mid-plane. In contrast to FIG. 2, the arrangement of FIG. 4 has bore holes 40 running parallel to the lengthwise direction of the leg 5 through the material portions between the rear surface 13 and the end surfaces 39, 39' of the recesses 37, 37' on each side of the narrow web segment 38, while at the same time the arrangement of FIG. 4 lacks the bore holes 35 of the embodiment of FIG. 2.

As illustrated in FIG. 5, the bottom surface 9 of the L-leg 5 and an adjacent part of the rear surface 13 of the L-leg 6 serve as a form-fitting contact interface with a surface area of the base plate 2, which extends parallel to the main plane of the latter, and also with a transverse end surface area 41 of the base plate 2. The material portion 33 of the material block 4 is firmly attached to the base plate 2 by means of two screw bolts 42 that pass through holes 40 extending parallel to the plane of the base plate 2 and are screwed into tapped holes in the base plate 2.

Figure 6:
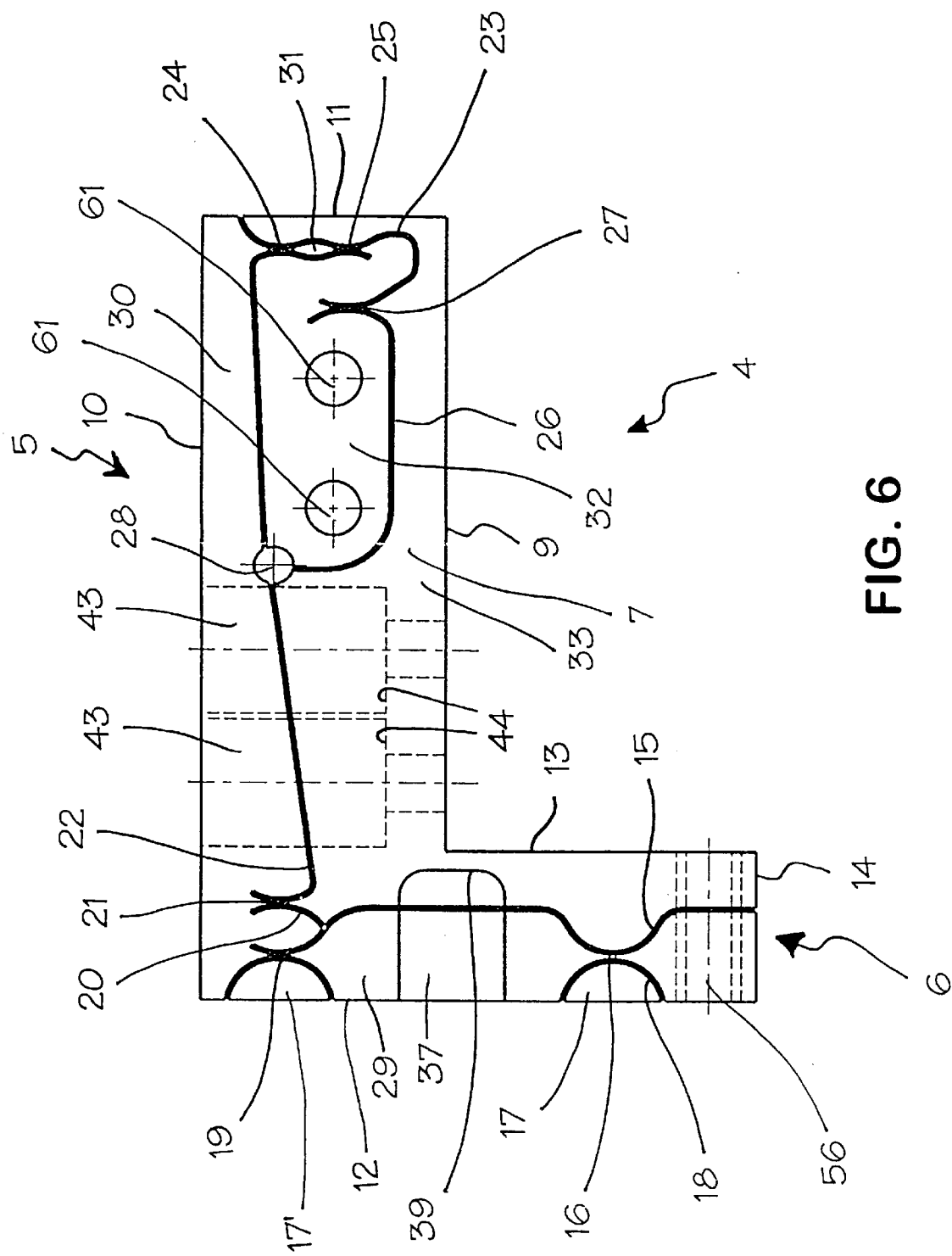
FIG. 6 represents another slight variation of the force-transmitting device of FIG. 2.
Figure 7:
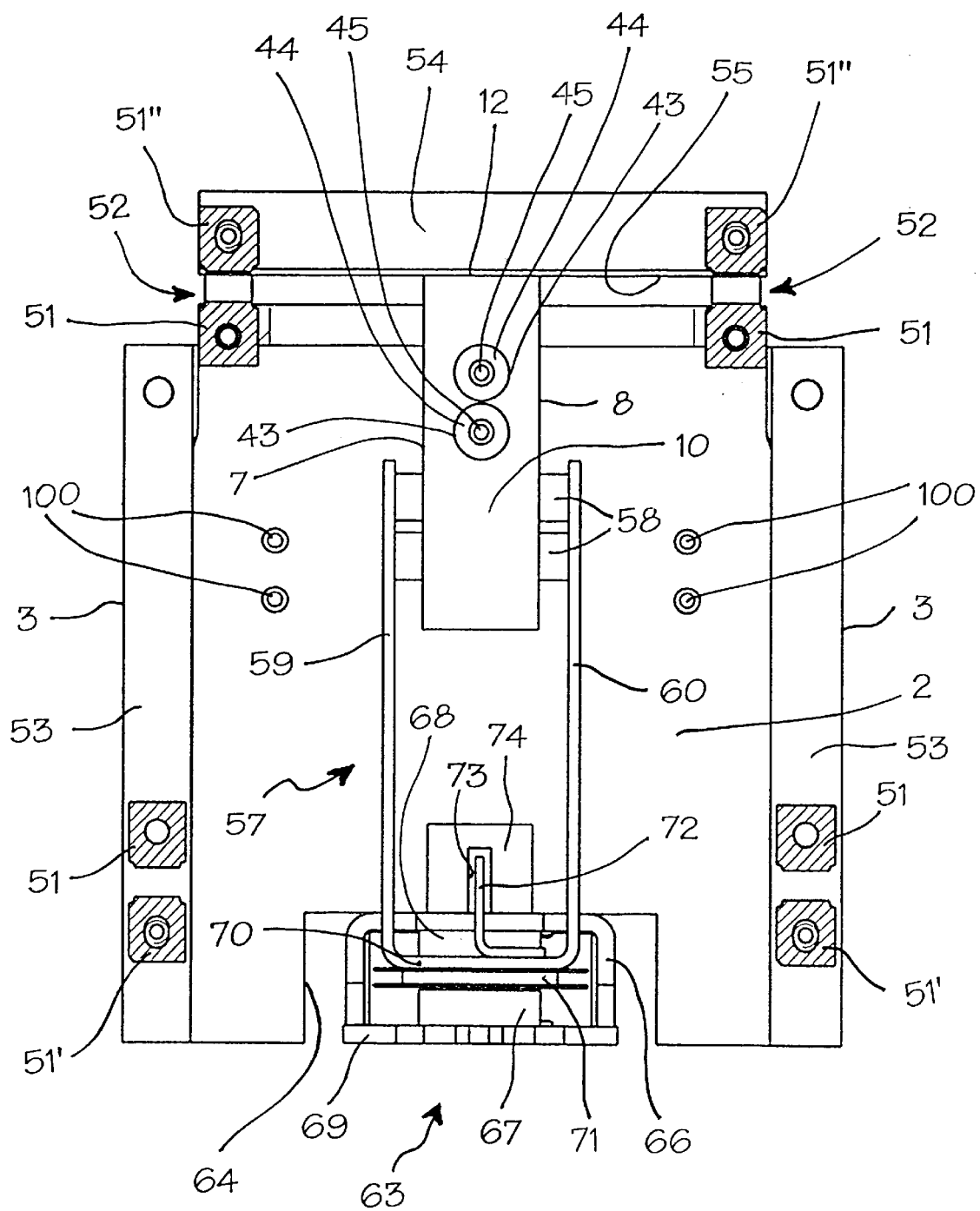
FIG. 7 represents a too view of the base plate with the device of FIG. 6 and other parts mounted in place.

A further alternative for attaching the material block 4 to the base plate 2 is shown in FIGS. 6 and 7. The material block 4 shown in FIG. 6 corresponds fully to the material block 4 of FIGS. 2 and 4 with respect to the shape of the material block and the way in which the levers 30, 32 and the coupling members 29, 31 are delineated by the thin linear cuts 15, 18, 20, 22, 23 and 26. The congruence of the embodiments also extends to the recesses 37, 37' by which the narrow web segment 38 of the coupling member 29 is formed. The corresponding parts in FIG. 6 have the same reference numbers as in FIGS. 2 and 4; and with respect to the shared reference numbers, the description given for FIGS. 2 and 4 also serves as reference for FIG. 6.

The material block 4 as illustrated in FIG. 6 is distinguished from FIGS. 2 and 4 by the absence of the bore holes 35 and 40, respectively. Instead, the L-leg 5 of the material block 4 is traversed by two bore holes 43 extending between its bottom surface 9 and top surface 10. The bore holes 43 have shoulders 44 formed by a step from a smaller diameter (in the material portion 33 attached to the base plate 2) to a larger diameter opening towards the top surface 10.

FIG. 7 presents a top view of the base plate 2 and the top surface 10 of the monolithic material block 4 that is mounted on it, illustrating that the bottom surface 9 of the L-leg 5 serves as contact surface for a form-fitting engagement with a surface area of the base plate 2 in the middle between the two side plates 3. Also shown are the heads of two screw bolts 45 that engage the shoulders 44, traverse the material portion of the L-leg 5 between the shoulders 44 and the bottom surface 9, and are screwed into the tapped holes 46 of the base plate 2 (FIG. 1), whereby the material portion 33 is firmly attached to the base plate 2.

Except for the aforementioned differences in the way the material block 4 is fastened to the base plate 2, the design of the rest of the weighing cell as illustrated in FIGS. 1, 3 and 5 is identical for the three attachment configurations described above. According to those drawing figures, two rigid, plate-shaped parallelogram guides 47, 48 extend on either side of and parallel to the plane of the base plate 2. Each of the parallelogram guides 47, 48 consists of a rigid plate-shaped part whose lengthwise direction is parallel to the side plates 3. Attached to the border areas 49, 50 that run across the width of the parallelogram guides 47, 48 are the attachment terminals 51 of two flexural pivots 52 at each transverse border area of each plate. Those of the flexures 52 that have terminals 51 connected to the border areas 50 of parallelogram guides 47, 48 have opposite attachment terminals 51' aligned with and fastened to border surface areas 53 of the side plates 3. The border surfaces 53 are parallel to the planes of the parallelogram guides 47, 48. In this arrangement, the border surface areas 53 are slightly raised in the attachment area in comparison to the rest of the same border surfaces to provide[] clear space for a deflection of the parallelogram guides 47, 48 in relation to the rotational axes formed by the virtual pivotal axes of the flexural pivots 52 that run parallel to the planes of the parallelogram guides. However, the slightly raised configuration of the attachment areas is not shown in FIGS. 1, 3, 5 and 7.

From where they are connected through their attachment terminals 51' to the side plates 3, the parallelogram guides 47, 48 extend in their lengthwise direction to a load receiver 54 that is arranged next to the front surface 12 of the material block 4. The load receiver 54 is connected to attachment terminals 51" of the flexural pivots 52 that are at their opposite attachment terminals connected to the border areas 49 of each of the parallelogram guides 47, 48. In this manner, the parallelogram guides 47, 48 in their attached condition to the side plates 3 and together with the load receiver 54 constitute a parallelogram guide mechanism in which the parallelogram plane is defined by the lengthwise direction of the parallelogram guides 47, 48 and the displacement travel direction of the load receiver 54.

As can be seen in FIGS. 3 and 5, the side of the load receiver 54 that faces towards the front surface 12 of the material block 4 has a slightly raised surface area 55 where the load receiver meets the coupling member 29 along a surface area bounded by the flexural pivot 16 on one side and the bottom surface on the other and where the load receiver 54 is attached to the coupling member 29 by means of screw bolts that are anchored in tapped holes 56 of the coupling member 29 (FIG. 2, 4 and 6).

As can further be seen in the partially sectional side view of the weighing cell in FIG. 3 and the top view in FIG. 7 (in which the parallelogram guide 47 is removed), a U-shaped lever extension 57 embraces the further lever 32 (which is formed in the material block 4) with two U-legs 59, 60 that are attached by two screw bolts 62 passing through two bore holes 61 of the further lever 32 (FIGS. 2, 4 and 6) and interposed space holders 58. The U-legs 59, 60 extend parallel to the planes of the base plate 2 and parallelogram guides 47, 48 in the direction towards the end portion of the stationary part 1 farthest from the load receiver 54, where the electromagnetic force-compensation system 63 (used as measuring transducer) is installed. To accommodate the measuring transducer, a recess 64 (FIG. 1) is formed in the respective part of the base plate, where one leg 66 of a magnet yoke 69 enclosing two plate-shaped permanent magnets 67, 68 is attached to the end surface 65 of the recess that runs transverse to the planes of the parallelogram and the base plate.

A compensation coil 71, held by the U-bottom 70 (of the lever extension 57) that connects the U-legs 59, 60 inside the magnet yoke 69, is immersed in the air gap between the two permanent magnets 67, 68. Also attached to the U-bottom 70 is a position sensor vane 72 that reaches into the position sensor gap 73 of a light gate sensor 74.

In the embodiments of FIGS. 1 through 7 as described above, the force to be measured is introduced into the load receiver 54 in the direction in which the parallelogram mechanism allows the load receiver to be deflected. As an example for introducing the force in this manner, a weighing pan carrier (not shown) may be arranged immediately on the load receiver. However, there are also other ways of coupling the load receiver 54 to the force to be measured. The levers 30, 32 of the material block 4 that are coupled to the load receiver 54 and the lever extension 57 reduce the force to be measured. A compensation current flowing through the compensation coil 71 is regulated by the position sensor signal of the position sensor 74 in such a manner that the compensating force that results from the interaction between the compensation coil 71 and the magnetic field of the permanent magnets 67, 68 is in equilibrium with the force to be measured that has been applied to the load receiver 54. Thus, the magnitude of the compensating current represents a measure for the magnitude of the force that is to be measured.

Figure 8:
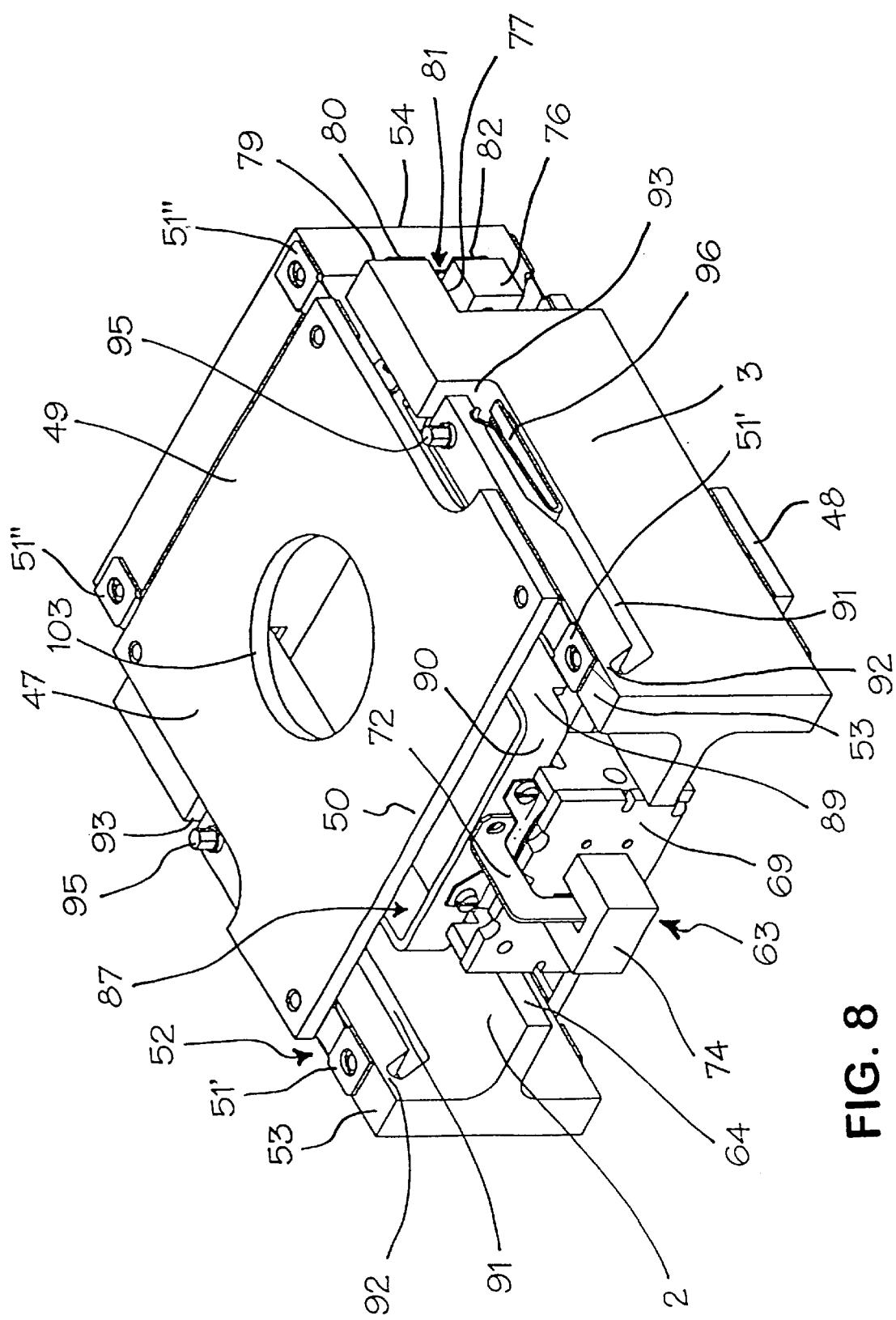
FIG. 8 represents a perspective view of another embodiment of the weighing cell as seen from the side of the measuring transducer.
Figure 9:
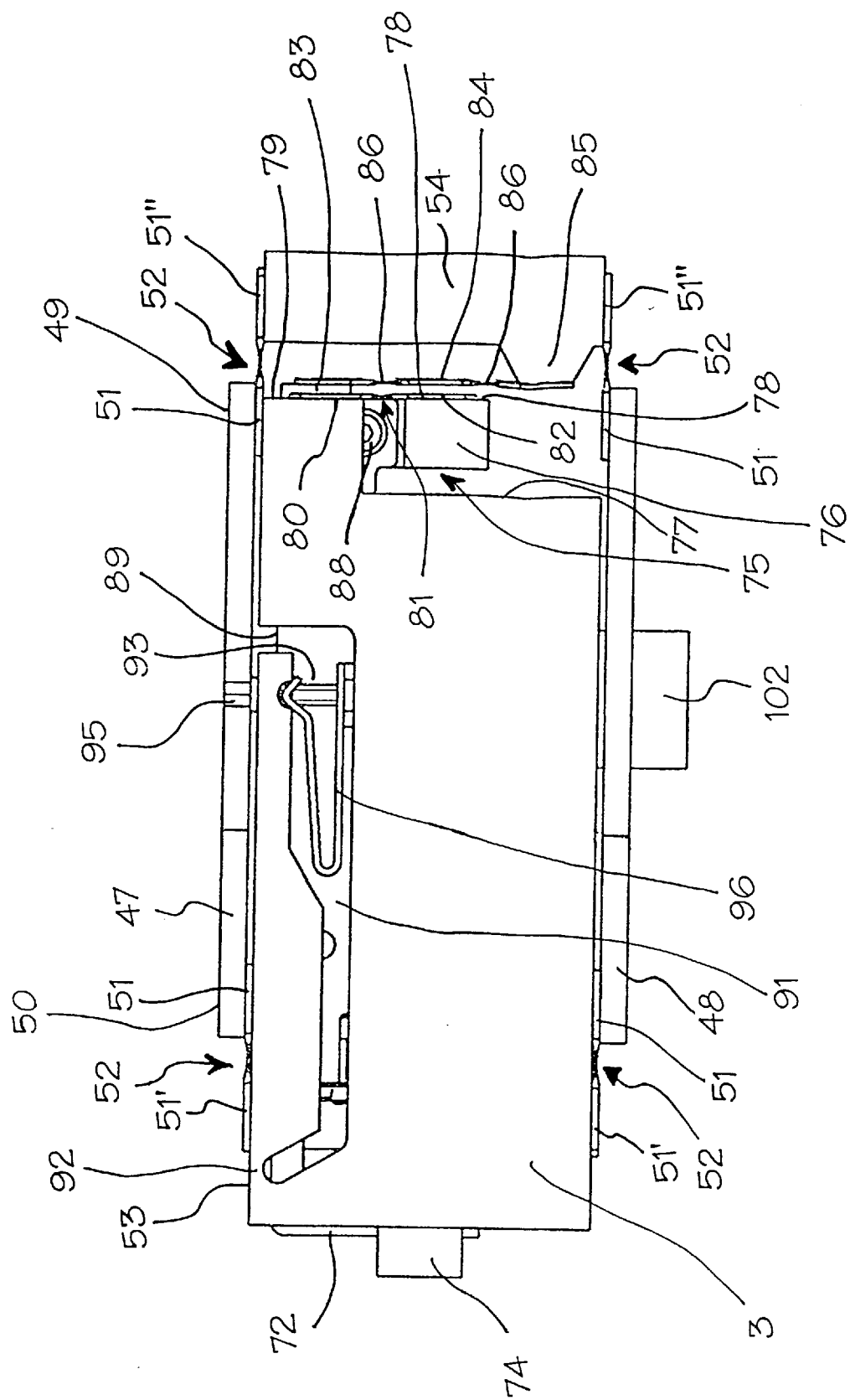
FIG. 9 represents a side view of the weighing cell of FIG. 8.
Figure 10:
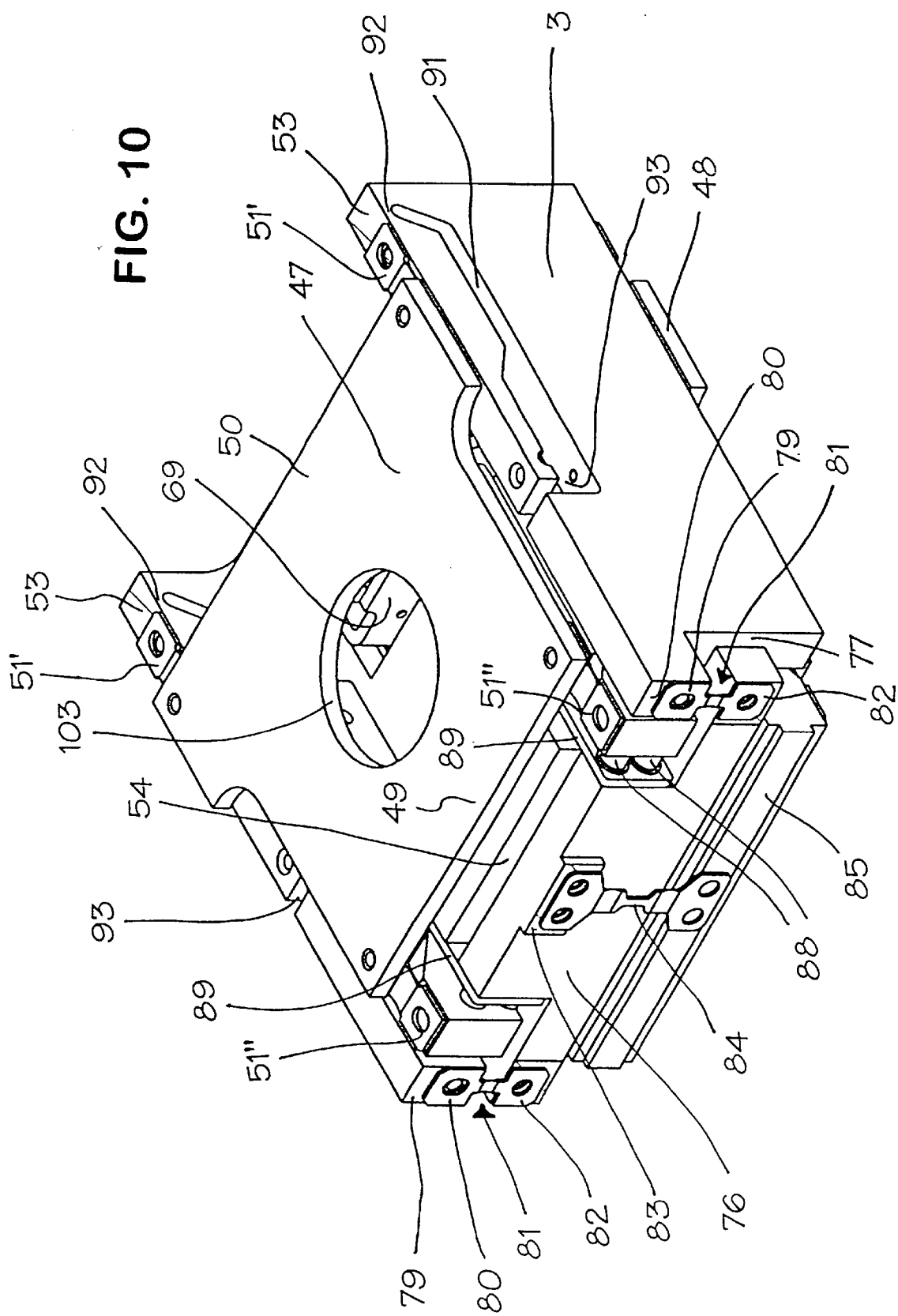
FIG. 10 represents a perspective view of a modified version of the weighing cell of FIGS. 8 and 9 as seen from the side of the load receiver.

In the embodiments of FIGS. 1 through 7 as described above, the two force-transmitting levers with the flexural domains 21, 27 forming the lever fulcrums and the coupling members 29, 31 are formed by appropriately shaped material portions of the monolithic material block 4 and supported on the base plate 2 by the stationary material portion 33 of the material block 4. In contrast to this arrangement, the embodiments of FIGS. 8 through 10 are distinguished by a different configuration of the device that transmits the force from the load receiver to the measuring transducer. Except for the difference in the force-transmitting device, the design of the embodiments of FIGS. 8 through 10 corresponds with the concept illustrated in FIGS. 1, 3, 5 and 7 with respect to all relevant parts, in particular the stationary part 1 and the parallelogram guides 47, 48 that are connected to it. Therefore, the corresponding parts in FIGS. 8 through 10 have the same reference numbers as in FIGS. 1, 3, 5 and 7. With respect to these reference numbers, the foregoing description also covers FIGS. 8 through 10.

Deviating from the embodiments of FIGS. 1 through 7, the lever 75 in the embodiments of FIGS. 8 through 10 is formed as a separate component. Near the end that is next to the load receiver 54, the lever 75 has a pivotal portion 76 transverse to the parallelogram plane and extending from a recess 77 in one side plate 3 that is open towards the load receiver 54 to a corresponding recess 77 that is formed in the other side plate 3. The front side 78 of the pivotal portion 76 that faces towards the load receiver 54 is aligned with frontal end surfaces 79 of the side plates 3 adjacent to the recesses 77. Each of the frontal end surfaces 79 serves as attachment surface for an attachment terminal 80 of a flexural pivot 81, whose opposite attachment terminal 82 is attached to the front side 78 of the end of the pivotal portion 76 that reaches into the recess 77. The virtual pivotal axes of the two flexural pivots 81 lie on a straight line that extends transverse to the parallelogram plane and represents the virtual fulcrum axis of the lever 75.

At a location half-way between the two side plates 3, the pivotal portion 76 of the lever 75 has a short lever arm 83 projecting beyond the plane of the flexural pivot 81 towards the load receiver 54. Through an attached coupling member 84, the short lever arm 83 is connected to a raised attachment area 85 of the load receiver 54. The coupling member is configured as a separate part with a rigid lengthwise portion parallel to the direction of the load receiver 54 extending between two virtual pivotal axes 86. Outside of the virtual pivotal axes 86, the coupling member 84 has terminal portions that are attached to the lever arm 83 and to the raised attachment area 85, respectively.

On the other side of the pivotal portion 76, opposite from the lever arm 83 in relation to the plane of the flexural pivots 81, a U-shaped lever extension 87, similar to the lever extension 57 of FIG. 7, is attached with screw bolts 88. The U-legs 89 of the lever extension 87 reach to the force compensation system 63 whose principal make-up has been described above in the context of FIG. 7. Compared to FIG. 7, the only difference is that the position sensor 74 is arranged on the side of the magnet yoke 69 that faces away from the load receiver 54, and the arrangement of the position sensor vane 72 on the U-bottom 90 is configured accordingly.

In the embodiment of FIGS. 8 and 9, the pivotal portion 76 lies behind the load receiver 54, as viewed in the direction from the attachment terminals 51" at the load-receiver end of the parallelogram guides 47, 48 to the attachment terminals 51' at the stationary part. Compared to FIGS. 8 and 9, the only difference in the embodiment of FIG. 10 is that (in relation to the same viewing direction) the pivotal portion 76 is arranged in front of the load receiver 54, whose raised attachment area 85 reaches around the pivotal portion 76 and projects out to the plane of the coupling member 84. With regard to those parts in FIG. 10 that are analogous to all other embodiments, the previously used reference numbers and the description for said parts also apply to FIG. 10.

As illustrated in the FIGS. 1, 5, 8, 9 and 10, the side plates 3 in all of the embodiments of the weighing cell have a continuous slit 91 starting in the vicinity of the attachment terminal 51' of the upper parallelogram guide 47 (in accordance with the orientation of the drawing) and running parallel to the plane of the parallelogram guides. At one end, the slit 91 is angled up so that it approaches the border surface area 53 that carries the attachment terminal 51' whereby a narrow material connection 92 is formed. At the opposite end 93, the slit 91 is open to the outside. In the embodiments of FIGS. 1 through 5, the open end 93 terminates at the frontal border surface 94 of the side plate 3. The frontal border surface 94 runs transverse to the plane of the base plate 2 and to the parallelogram plane. In contrast, in the embodiments of FIGS. 8, 9 and 10, the open end of the slit 93 terminates at the border surface area 53 that runs parallel to the plane of the base plate 2.

An adjustment screw 95 (FIGS. 5, 8 and 9) that crosses the slit 91 near its open end 93 allows the adjustment of the width of the slit perpendicular to the parallelogram guides 47, 48, with the narrow material connection 92 functioning as a flexural pivot. The adjustment screw 95 works against an elastic element 96, e.g., a helix spring as in FIG. 5 or a leaf spring as in FIGS. 8 and 9, that has the function of pushing the slit 91 apart. By varying the width of the slit, the corner points of the parallelogram guide mechanism can be precisely adjusted.

In all of the illustrated configurations, the force that is introduced into the load receiver 54 for the purpose of being measured is directed from top to bottom. As shown in FIG. 3, a support 98 is attached by screw bolts 99 to the downward-facing surface 97 of the base plate 2. The bore holes 100 for inserting the screw bolts 99 in the base plate 2 can also be seen in FIGS. 1 and 7.

To describe the arrangement in more detail, the support 98 has a transverse part 101, reaching from one side plate 3 to the other, in which the screw bolts 99 are anchored. Halfway between the side plates 3, the transverse part 101, which comes close to the lower parallelogram guide 48, has a column 102 directed perpendicularly to the planes of the base plate and the parallelogram guides 47, 48 and projecting downwards to pass with lateral clearance through an opening in the lower parallelogram guide 48. The projecting portion of the column 102 serves to mount the weighing cell, for example on the chassis plate of a balance housing. In order to maintain the advantages of a symmetric configuration, the upper parallelogram guide 47 has an opening 103 (FIGS. 5, 8 and 10) in the place where the lower parallelogram guide 48 has the opening 104 for the passage of the column 102. The opening 104 of the lower parallelogram guide 48 for the passage of the column 102 is partially visible in FIG. 5.

Major portions of the embodiments of FIGS. 11a and 11b share the same principal configuration and are therefore referenced with the same numbers in the following description. Both embodiments are made from a hollow-profile section 200 with a rectangular outside cross-section that is cut from a length of extruded profile stock. The interior space of the hollow-profile section 200, likewise of rectangular cross-section, is divided by an interior transverse wall 201 into two rectangular corridors 202, 203. The latter are enclosed by two side walls 204, 205 as well as upper and lower transverse walls 206, 207. The side walls 204, 205 are integrally connected to the interior transverse wall 201 and perpendicular to it. The exterior transverse walls 206, 207 run parallel to the plane of the interior transverse wall 201 and are integrally connected to the borders of the side walls 204, 205. Thus, the smaller corridor 202 is enclosed by the interior transverse wall 201, the portions of the side walls 204, 205 that extend towards the lower transverse wall 206, and the lower transverse wall 206 itself, while the larger corridor 203 is enclosed by the interior transverse wall 201, the portions of the side walls 204, 205 that extend towards the upper transverse wall 207, and the upper transverse wall 207 itself.

Figure 11A:
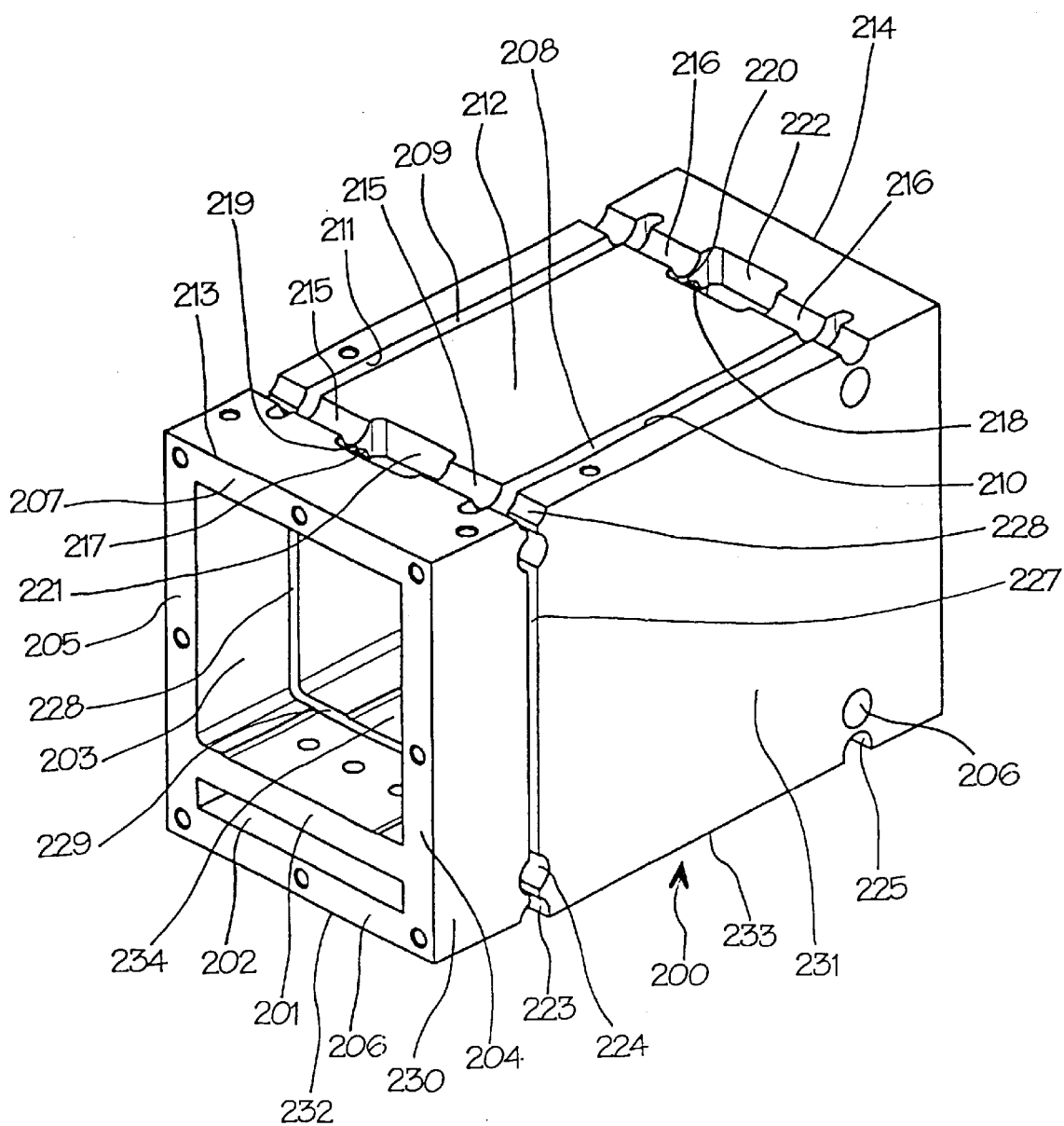
FIG. 11a represent perspective views of two embodiments and 11b in which the parallelogram guide mechanism is formed out of a piece of hollow-profile stock.

The embodiment shown in FIG. 11a has two continuous lengthwise slits 208, 209 in the upper transverse wall 207 (in the orientation of FIG. 11a) that extend in lengthwise direction (perpendicular to the rectangular cross-section) of the hollow-profile section 200. The lengthwise slits 208, 209 in FIG. 11a are spaced at such a distance from the respectively adjacent side wall 204, 205 that the respective border 210, 211 of each slit that is nearest to the side wall runs flush with the interior surface of that side wall 204, 205. The lengthwise slits 208, 209 between themselves delineate an upper parallelogram guide 212 (in the orientation of FIG. 11a).

At a distance from the front and rear edges 213, 214 of the hollow-profile section 200, at each pair of end portions of the lengthwise slits 208, 209, there is a pair of transverse grooves formed in the hollow-profile section 200. Clearly visible in FIG. 11a are the pairs of grooves 215, 216 formed at the outer surface of the upper parallelogram guide 212. The grooves 215, 216 have a convex-curved profile (in a parallel section to the parallelogram plane) and extend across the width of the parallelogram guide 212 between the lengthwise slits 208, 209 as well as across the portions of the side walls 204, 205 that run flush with the slits. Opposite the grooves 215, 216 that are formed from the outside, analogous pairs of grooves 217, 218 are formed from the inside of the parallelogram guide 212. The two pairs of grooves 215, 217 and 216, 218 each delimit a thinned-down domain 219, 220 that serves as a flexural pivot for the displacement of the parallelogram guide 212.

To adjust the flexural stiffness of the thinned-down domain 219, 220, the upper parallelogram guide 212 has openings 221, 222 formed in the areas of the two pairs of grooves 215, 217 and 216, 218, respectively. The openings 221, 222 cut completely through the respective ends of the parallelogram guide 212, transverse to the plane of the latter. Together with the lengthwise slits, 208, 209, the openings 221, 222 determine the length of the thinned-down domains 219, 220 transverse to the lengthwise direction of the parallelogram guide 212.

In the invisible area (in FIG. *11a*) of the lower transverse wall 206 and adjacent areas of the two side walls 204, 205, there are lengthwise slits, grooves, thinned-down domains and openings analogous to the lengthwise slits 208, 209, grooves 215, 216, 217, 218, thinned-down domains 219, 220, and openings 221, 222 so that a lower parallelogram guide, analogous to the upper parallelogram guide 212, is formed in that area. In this regard, FIG. 11a shows only the recesses 223, 226 in the side wall 204 that are in line with the grooves that delimit the thinned-down domains of the lower parallelogram guide.

A transverse slit 227 extends perpendicular to the lengthwise direction across the side wall 204 from the recess that aligns with the groove 215 all the way to the corresponding recess 223 of the side wall 204 (that aligns with the corresponding groove of the lower parallelogram guide). An analogous transverse slit 228, cutting through the side wall 205 opposite the side wall 204, is aligned with the transverse slit 227 in a transverse plane in relation to the lengthwise direction the parallelogram guides. Further, the interior transverse wall 201 is perforated by a transverse slit 229 connecting the transverse slits 227, 228. In this manner, the transverse slits 227, 228, and 229 delineate the load receiver 230 against the stationary part 231. Accordingly, the load receiver 230 comprises the portions of the side walls 204, 205 and transverse walls 206, 207 that are bounded on one side by the frontal edge 213 and on the other side by the transverse slits 227, 228 and by the thinned-down domains (adjacent to the slits 227, 228) of the upper and lower parallelogram guides, while the stationary part 231 comprises the portions of the side walls 204, 205 that are bounded on one side by the rear edge 214 and on the other side by the transverse slits 227, 228, and also the portions of the transverse walls 206, 207 that are bounded on one side by the rear edge 214 and on the other side by the thinned-down domains 220 at the far end (in relation to the load receiver 230) of the parallelogram guides.

Figure 11B:
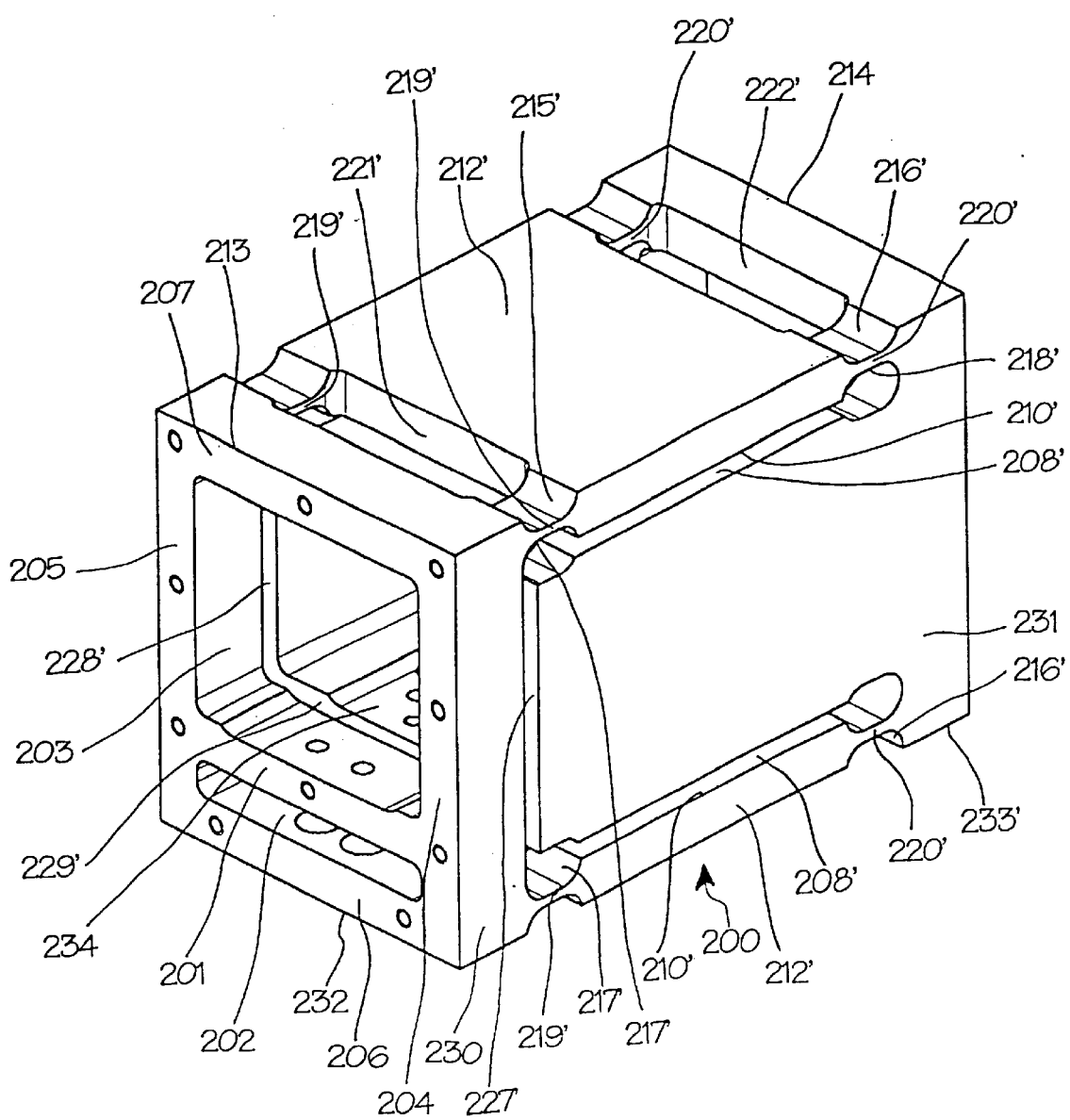

Compared to FIG. 11a, the only relevant difference in FIG. 11b is in the arrangement of the lengthwise slits with corresponding changes in the transverse slits. As seen in FIG. 11b, the lengthwise slits delimiting the two parallelogram guides 212' are formed in the side walls 204, 205, of which only the lengthwise slits 208' in the side wall 204 are visible in FIG. 11b, while the symmetrically aligned lengthwise slits in the side wall 205 are invisible in FIG. 11b. The borders 210' of the lengthwise slits 208' that are closest to the respectively adjacent parallelogram guides 212' are running flush with the inner surfaces of the transverse walls 206, 207.

Further, as a minor deviation from FIG. 11a, the pairs of grooves 215', 217' and 216', 218' that delimit the thinned-down domains 219', 220' do not have a semi-circular cross-section perpendicular to the plane of the parallelogram guides 212' but are elongated instead in the longitudinal direction. As in the embodiment of FIG. 11a, the length of the thinned-down domains 219', 220', measured transverse to the lengthwise direction, is delimited by openings 221', 222' in the two parallelogram guides 212'.

The transverse slits 227', 228' that delimit the load receiver 230 against the stationary part 231 extend between the grooves 217' that face towards the inner surfaces of the parallelogram guides and delineate the sides of the thinned-down domains 219' that face each other. As in FIG. 11a, the continuous transverse slit 229' of the interior transverse wall 201 connects the two transverse slits 227' and 228'.

As can be seen in FIGS. 11a and 11b, the front surface of the load receiver 230 that is enclosed by the frontal edge 213 has attachment holes for mounting a weighing pan carrier. The force to be measured by the apparatus in FIGS. 11a and 11b is directed top to bottom, so that the effect of a load is to deflect the load receiver downwards. This is why the side walls 204, 205 are extended in the area of the stationary part so that they reach beyond the outside surface 232 of the lower transverse wall 206 that faces in the direction of the deflective displacement. In the embodiment of FIG. 11a, the extended side wall portions 233 extend from the rear edge 214 (farthest from the load receiver 230) to the transverse slits 227, 228 that separate the load receiver 230 from the stationary part 231. In the embodiment of FIG. 11b, on the other hand, the extended side wall portions 233' extend from the rear edge 214 (farthest from the load receiver 230) to the nearest groove 216' that delineates the thinned-down domain 220' at the end of the parallelogram guide 212' that is near the rear edge 214. Thus, when the hollow-profile section 200 with the extended side wall portions 233 (or 233', in FIG. 11b) is mounted on a chassis plate that is parallel to the plane of the parallelogram guides 212 (or 212'), there will be a clearance gap between the chassis plate and the facing surfaces of the load receiver 230 and lower parallelogram guide 212 (212'), allowing the load receiver and parallelogram guide to deflect downwards under a load.

In both embodiments, the portion 234 of the interior transverse wall 201 between the rear edge 214 and the transverse slit 229 (229') serves as the base plate for mounting the force-transmitting device that contains the one or more levers. The portion 235 of the interior transverse wall 201 from the transverse slit 229 (229') to the front edge 213 is available for attaching a coupling member connected to the lever of the force-transmitting device, so that the load receiver 230 is coupled to the lever and the deflection of the load receiver under a load is transmitted to the lever.

Figure 12:
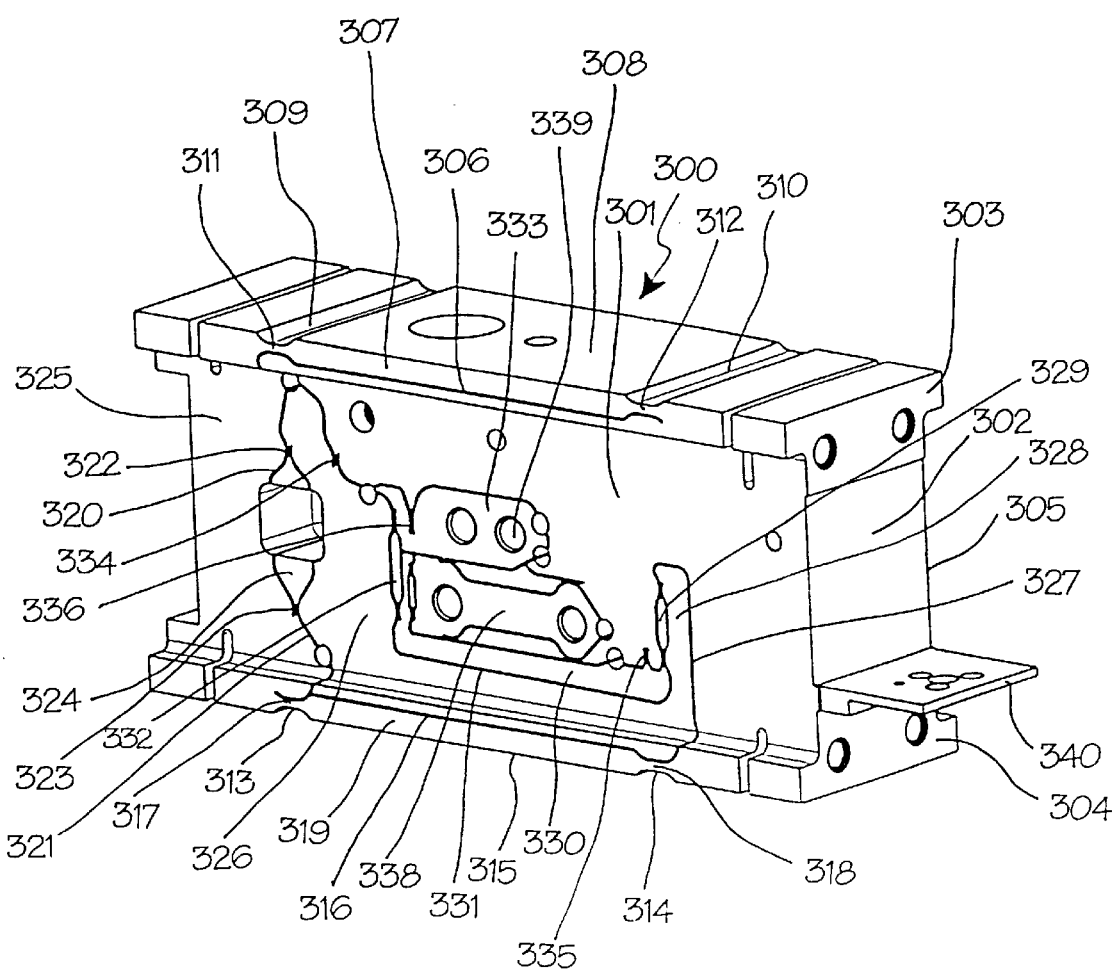
FIG. 12 represents a perspective view of an embodiment with a monolithically integral configuration of the parallelogram guide mechanism and the force-transmitting device.

In contrast to all of the embodiments described up to this point, the embodiment of FIG. 12 is based on an essentially rectangular monolithic material block 300 whose largest pair of surfaces 301 extend parallel to the parallelogram plane of the guide mechanism. The cross-section of the material block 300 transverse to the parallelogram plane has the shape of an H-profile as can be seen in FIG. 12, particularly by looking at the end surface 302 that runs transverse to and connects the largest pair of surfaces 301 that are parallel to the parallelogram plane. Accordingly, the material width of the material block 300 perpendicular to the parallelogram plane is greater at the two flanges 303, 304 than at the connecting web 305 of the H-profile.

A thin linear cut 306 traversing the upper H-flange 303 in FIG. 12 forms a material-free space delimiting within the material block 300 an upper parallelogram guide 307 that is bounded on the opposite side from the thin linear cut 306 by the top surface 308 running transverse to both the largest surface 301 and the end surface 302. Opposite the terminal portions of the thin linear cut 306, the top surface 308 has recesses 309, 310 that are curved towards the interior of the block and have their symmetric mirror-images in the opposing curves of the terminal portions of the thin linear cut 306. Thus, the curved recesses 309, 310, together with their counterparts in the terminal portions of the thin linear cut 306, are delineating thinned-down domains 311, 312 that serve as flexural pivots of the upper parallelogram guide 307.

In the same manner, a lower parallelogram guide 319 between flexural pivots 317, 318 is delineated in the lower H-flange 304 in FIG. 12 by two recesses 313, 314 in the bottom surface 315 of the block that are mirror images of the curved recesses 309, 310 and by a thin linear cut 316 that is the mirror image of the thin linear cut 306.

Starting from its left terminal portion (in the arrangement of FIG. 12), the thin linear cut 306 turns and then runs transverse to the lengthwise direction of the parallelogram guides 307, 319 in a continuing section 320 that ends at some distance from the lower parallelogram guide 319 and has two detours curved towards the inside of the material block 300 and located at an interval from each other. A thin linear cut section 321 branches off from the left-side terminal portion (in the arrangement of FIG. 12) of the thin linear cut 316 delineating the lower parallelogram guide 319 and then runs next to and forms mirror-images of the curved detours of the continuing linear cut section 320. Thus, the mirror-symmetric curves of the continuing section 320 and the linear cut section 321 delineate thin flexural domains 322, 323 between each other, so that a coupling member 324 extending transverse to the lengthwise direction to the parallelogram guides 307, 319 is formed between the thin flexural domains 322, 323.

The foregoing arrangement of the continuing linear cut section 320 and the portion of the thin linear cut section 321 from the lower flexural domain 323 of the coupling member 324 to the flexural pivot 317 of the lower parallelogram guide 319 delimits the load receiver 325 that hangs together with the coupling member 324 through the thin flexural domain 323.

On the far side from the load receiver 325, the thin linear cut section 321, together with the portion of the continuing section 320 from the upper flexural domain 322 of the coupling member 324 to the flexural pivot 311 of the upper parallelogram guide 307, delimits a lever 326 that hangs together with the coupling member 324 through the thin flexural domain 322.

The lever 326 is delimited against the lower parallelogram guide 319 by the linear cut 316. Beyond the terminal portion next to the flexural pivot 318 at the far end from the load receiver 325, the linear cut continues transverse to the lengthwise direction of the parallelogram guides 307, 319 and ends approximately halfway into the H-web 305, so that the continuing section 327 delimits a coupling portion 328 of the lever 326. The coupling portion 328 of the lever 326 connects through a further coupling member 329, likewise delimited by thin linear cuts and equipped with flexural pivots at both ends, to a further Lever 330 that follows the lever 326 in the lever-reduction chain. The further lever 330 is separated from the lever 326 by a thin linear cut 331 located within the web portion 305 of the H-profile.

At its far end from the coupling portion 328, the further lever 330 is connected through a coupling member 332 to the output lever 333 of the force-transmitting device that is constituted by the arrangement of levers and coupling members. Like the lever 326 and its coupling member 324, the other coupling members and levers are bounded by thin linear cuts. The same is true for the flexural domains 334, 335 and 336 that form the fulcrums of these levers. The entire arrangement of thin linear cuts is clearly represented in FIG. 12.

The flexural domains 334, 335 and 336 that serve as lever fulcrums are formed out of the stationary supporting part 337 of the material block 300. On the opposite side from where the levers 326, 330 and 333 are arranged, the supporting part 337 is delimited against the upper parallelogram guide 307 by the thin linear cut 306.

Also shown in FIG. 12 is an interior parallelogram-guided portion 338 of the material block 300 that is coupled to the further lever 330 and serves to couple a calibration weight to the force-transmitting device as discussed in detail in the earlier patent application P 196 05 087. Bore holes 339 formed in the output lever 333 are provided for the attachment of the legs of a lever extension that extend to an electromagnetic force-compensation system mounted on a console 340 of the stationary part in accordance with the same general concept that is also represented in FIG. 7.

What is claimed is:

1. A force measuring apparatus, comprising:
   (a) stationary base means;
   (b) load receiving means for receiving the force to be measured;
   (c) parallelogram guide means connecting said load receiving means for vertical movement along a path of planar translatory motion relative to said base means in a vertical plane containing the longitudinal axis of said parallelogram guide means and the direction of displacement of said load receiving means, said parallelogram guide means including a single pair of horizontal vertically-spaced planar guide members (47, 48) that are rigid within their respective planes and are elastically flexible transverse to their respective planes, each of said guide members including a stationary end connected with said base means, and a movable end connected with said load receiving means;
   (d) measuring transducer means connected with said base means for producing a signal corresponding with the force to be measured;
   (e) force transmitting means including at least one lever for transmitting motion by said load receiving means to said transducer means;
   (f) said base means having an H-shaped cross-section and comprising:
      (1) a horizontal base plate (2); and
      (2) a pair of parallel spaced vertical side plates (3) connected with and arranged normal to said base plate, said base means extending between said parallelogram guide members with said stationary ends of said parallelogram guide members being connected with said side plates;
      (3) each of said side plates containing a horizontal slit (91) adjacent said stationary end of one of said parallelogram guide members; and
   (g) adjustment means (95) for adjusting the width of said slits in a direction transverse to the planes of said parallelogram guide members, thereby to precisely adjust the relative positions of said guide members.

2. The force-measuring apparatus according to claim 1, wherein said base plate and said side plates are formed from a section of an integral, monolithic block having an H-shaped cross-sectional configuration, said block having two vertical flange forming said side plates, and a transversely oriented web forming said base plate.

3. The force-measuring apparatus according to claim 1, wherein said side plates have border surface areas parallel to said parallelogram guide members, said stationary ends of said parallelogram guide members being fastened to said border surface areas.

4. The force-measuring apparatus according to 1, wherein said lever is rotatably constrained on said stationary base means by at least one flexural pivot that has a fixed end and a flexing end, and a virtual pivotal axis located between them, said fixed end being attached to said stationary part and said flexing end being fastened to said lever, with the virtual pivotal axis forming a fulcrum for said lever.

5. The force-measuring apparatus according to claim 4, wherein each of said two side plates has a flat frontal attachment area perpendicular to the lengthwise direction of the parallelogram guide members wherein further said fixed end of each of two flexural pivots is attached to each attachment area', and said lever has a pivotal portion extending between and attached to the flexing ends of the flexural pivots.

6. The force-measuring apparatus according to claim 5, wherein said pivotal portion is arranged in front of said load receiving means when viewing the apparatus from an angle where said moveable ends of the parallelogram guide members point toward the viewer and the stationary ends point away from the viewer.

7. The force-measuring apparatus according to claim 4, wherein said pivotal portion is arranged adjacent the rear of said load receiving means when viewing the apparatus from an angle where the moveable ends of the parallelogram guides point towards the viewer and the stationary ends point away from the viewer.

8. The force-measuring apparatus according to claim 1, wherein said force-transmitting, device comprises Et monolithic material block that is traversed by material-force spaces extending transverse to the plane of said parallelogram means, the material-free spaces defining material portions within the material block representing, respectively, a mounting portion for mounting the force-transmitting device on the base plate, a first lever, and an elastically flexible portion connecting the first lever to the mounting portion and representing a virtual fulcrum axis.

9. The force-measuring apparatus according to claim 8, wherein said material block is traversed by further material-free spaces extending transverse to the parallelogram plane, the further material-free spaces defining a material portion within the material block representing a first coupling member having one end integrally connected to the load receiving means, and an opposite end integrally connected to an input arm of said first lever, said first coupling member serving to transmit the force to be measured from the load receiving means to said first lever.

10. The force-measuring apparatus according to claim 8 wherein said material block is traversed by further material-free spaces extending transverse to the parallelogram plane, said further material-free spaces defining material portions within the material block representing, respectively, at least one further lever arranged in series after said first lever, and a further coupling member having one end integrally connected to an output arm of said first lever, and an opposite end integrally connected to an input arm of said further lever.

11. The force-measuring apparatus according to claim 8, wherein at least a part of the material-free spaces are formed only as thin linear cuts separating the material portions of the material block.

12. The force-measuring apparatus according to claim 8, wherein said mounting portion has a contact surface in form-fitting contact with a surface area of said base plate and is firmly attached to said base plate by means of at least one screw bolt that extends parallel to the parallelogram plane.

13. The force-measuring apparatus according to claim 8, wherein said mounting portion has a contact surface in form-fitting contact with a surface area of said base plate and is firmly attached to at least one attachment part that is connected to, and stands off perpendicularly from, said base plate.

14. The force-measuring apparatus according to claim 8, wherein said mounting portion has a contact surface in form-fitting contact with a surface area of said base plate (2) facing towards one of said parallelogram guide members (47, 48) and also with an adjoining frontal surface area of said base plate extending transverse to the plane of said parallelogram guide members, and further said mounting portion is firmly attached to said base plate by means of at least one screw bolt (42) that traverses said frontal surface area.

15. The force-measuring apparatus according to claim 9, wherein said material-block has an L-shaped configuration in the parallelogram plane, said first coupling member being formed in the part of the L that extends parallel to said load receiver means, and said first lever being formed in the part of the L that extends parallel to the base plate.

16. The force-measuring apparatus according to claim 1, wherein said measuring transducer is attached to said base plate.

17. The force-measuring apparatus according to claim 1, and further including a support element attached to a surface area of said base plate, said support element comprising a column extending at a right angle to said base plate and passing with clearance through an opening contained in the parallelogram guide that is faced by the surface area of said base plate.

18. A force-measuring apparatus, comprising:
(a) a hollow monolithic block (200) having a rectangular cross-sectional profile and containing at least one through passage, thereby defining a pair of parallel spaced vertical side walls (204, 205), and transverse top (207) and bottom (206) walls connected between said side walls;
(b) said block containing a plurality of material-removed lengthwise and transverse slits that define in said block:
(1) stationary base means (231);
(2) load-receiving means (230) for receiving a force to be measured;
(3) parallelogram guide means (212) connecting said load receiver means for vertical movement relative to said base means, said parallelogram guide means including a single pair of horizontal parallel spaced planar guide members (212') that are defined by said lengthwise slits and are rigid within their respective planes and are elastically flexible about flexure pivots formed by thinned-down domains remaining transverse to their respective planes, each of said guide members including a stationary end connected with said base means, and a movable end connected with said load receiving means;
(c) measuring transducer means connected with said base means for producing a signal corresponding with the force to be measured; and
(d) force transmitting means including at least one lever for transmitting motion by said load receiving means to said transducer means.

19. The force-measuring apparatus according to claim 18, wherein said lengthwise slits are formed in said transverse walls of the hollow block.

20. The force-measuring apparatus according to claim 18, wherein said lengthwise slits are formed in said side walls of the hollow block.

21. The force-measuring apparatus according to claim 18, wherein each of the thinned-down domains is bounded between a pair of grooves of said hollow block that lie opposite each other across the plane of the respective parallelogram guide members and are convex-curved towards each other in a cross-sectional view perpendicular to the planes of the parallelogram guide members.

22. The force-measuring apparatus according to claim 18, wherein said parallelogram guide members have cut-out openings in the vicinity of said thinned-down domains traversing the hollow block at a right angle to the plane of said parallelogram guide means.

23. The force-measuring apparatus according to claim 18, wherein the two side walls are extended beyond the transverse wall whose outside surface faces in the direction of a load-induced motion of said load receiver means.

24. A force-measuring apparatus, comprising:
(a) a stationary monolithographic rectangular block (300);
(b) said block containing material reduced portions defining in said block;
(1) a stationary base portion;
(2) load receiving means (325) for receiving a load to be measured;

(3) parallelogram means guiding said load receiver means for vertical displacement relative to said stationary base portion said parallelogram means including a single pair of parallelogram guide members (307, 319) arranged in horizontal vertically spaced planes, said guide members being rigid throughout their length and having lines of elastic flexibility transverse to said planes, said guide members having movable first ends connected with said load receiving means, and stationary second ends connected with said stationary base portion;

(c) measuring transducer means for producing a signal corresponding with the force to be measured;

(d) force transmitting means including at least one lever that receives the force to be measured through a coupling from said load receiver means and is rotatable in relation to a fulcrum axis that is fixed on a support portion of the stationary part extending between said two parallelogram guide members in a plane that is parallel to the common plane of said parallelogram guide members;

(e) said load receiving means, said parallelogram guide means and said stationary portion being defined by material-free spaces that traverse said block at right angles to the plane of said parallelogram means;

(f) said monolithic block having in the dimension transverse to said parallelogram plane portions of greater material width in the areas of said parallelogram guide members and their defining material-free spaces, and a portion of lesser material width in the area of said lever.

25. The force-measuring apparatus according to claim 24, wherein said monolithic block has an H-shaped profile with respect to a cross-section that is perpendicular to the parallelogram plane, the H-profile having two flanges representing the portions of greater material width, and a web segment representing the portion of lesser material width.

26. The force-measuring apparatus according to claim 24, wherein at least a part of the material-free portions defining said load receiver means, said parallelogram guide members, and said stationary base are formed only by thin linear cuts.

27. The force-measuring apparatus according to claim 24, wherein said stationary base include a support portion adjacent one of said two parallelogram guide members directly across one of the material-free spaces, and a first lever that is coupled to the load receiver lies adjacent to the other of the two parallelogram guide members directly across another of the material-free spaces.

28. The force-measuring apparatus according to claim 27, wherein said first lever has a near side and a far side with respect to the parallelogram guide that lies adjacent defining said first lever, and further wherein the thin linear cut defining said far side extends in the area of lesser width of the material block.

* * * * *